(12) United States Patent
Brewer et al.

(10) Patent No.: US 9,665,313 B2
(45) Date of Patent: May 30, 2017

(54) PRODUCTION PRINTING SYSTEM WITH DOCUMENT MANAGEMENT INTERFACE

(71) Applicants: John Brewer, Malvern, PA (US); Sravanti Vongole, Exton, PA (US)

(72) Inventors: John Brewer, Malvern, PA (US); Sravanti Vongole, Exton, PA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/717,851

(22) Filed: May 20, 2015

(65) Prior Publication Data

US 2016/0342368 A1 Nov. 24, 2016

(51) Int. Cl.
*G06F 3/12* (2006.01)
*G06K 15/00* (2006.01)
*H04N 1/00* (2006.01)

(52) U.S. Cl.
CPC .......... *G06F 3/1204* (2013.01); *G06F 3/1268* (2013.01); *G06F 3/1282* (2013.01); *G06K 15/002* (2013.01); *G06K 15/4045* (2013.01); *G06K 15/4095* (2013.01); *H04N 1/00127* (2013.01)

(58) Field of Classification Search
None
See application file for complete search history.

(56) References Cited

U.S. PATENT DOCUMENTS

2009/0292616 A1* 11/2009 Mirmotahari .......... G06Q 10/10 705/26.1
2014/0233065 A1* 8/2014 Fischer ................. G06F 3/1208 358/1.15
2014/0351063 A1 11/2014 Brewer et al.

OTHER PUBLICATIONS

U.S. Appl. No. 14/199,903, John Brewer et al., filed Mar. 6, 2014.
U.S. Appl. No. 14/598,755, John Brewer et al., filed Jan. 16, 2015.

* cited by examiner

*Primary Examiner* — Andrew H Lam
(74) *Attorney, Agent, or Firm* — Cooper & Dunham LLP

(57) ABSTRACT

A production printing system includes a generic interface to communicate with a plurality of document management systems.

16 Claims, 30 Drawing Sheets

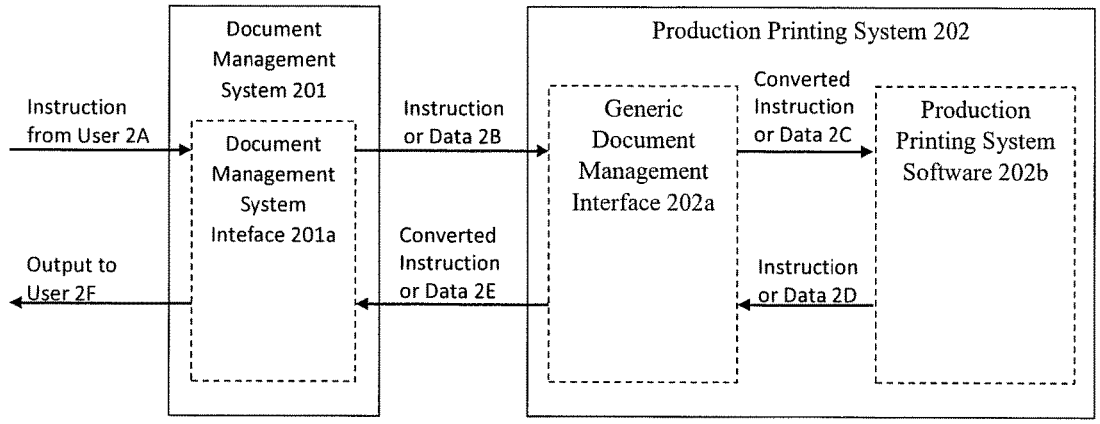

Fig. 2A

| Access Rights To Production Printing System | | | |
|---|---|---|---|
| | Third Party | Production-Side Provider | User |
| Access to Third Party Documents? | Yes (only to own documents) | No, except for documents sent for a print job | Yes, for documents specified by the third party that is accessible to user |
| Modification of Document? | Yes (only to own documents) | No | No |
| Modification of Metadata? | Yes (only to own documents) | No | No |
| Modification of Finishing Options? | Yes (only to own documents) | No | Yes, for documents specified by the third party that is accessible to the user |
| Modification of Document Access Rights? | Yes (only to own documents) | No | No |

Fig. 2B

CHORI - Cataloging

My Account: Karl Ericsson

| Home | Current Catalog | Upload Documents | Edit Catalog Documents | Options |

Welcome to your home page! Please select from one of the following options to proceed with your tasks.

Upload Documents
Upload your documents from your computer, catalog, a storage device or CHORI's document management system

View Current Catalog
Review all the documents that you have previously uploaded to the catalog and any other documents uploaded by others that you have access to.

Edit Catalog Documents
Edit, replace or update documents that you have previously submitted to the catalog.

Create Documents
Create a new document

Catalog Search
Start here to browse an archive of all documents currently on the catalog.

Name:
Type:

History
View all the actions that you have performed (e.g., uploading, editing, deleting, etc.) on documents in the catalog.

View History

Fig. 7B

CHORI - Cataloging

| Home | | Current Catalog | | Upload Documents | | Edit Catalog Documents | | Options |

My Account: Karl Ericsson

Please select the method by which you will be uploading documents.

Upload Documents From My Computer
This option allows you to upload documents from your computer.

[ Browse ] [          ] [ Upload ]

Upload Documents From CHORI Document Management System
This option allows you to upload documents from our Document Management System. However, subject to certain conditions (e.g., access rights, security, etc.), not all items can be uploaded to the catalog.

[ Browse ] [          ] [ Upload ]

Upload Documents Catalog
This option allows you to upload documents stored in the catalog.

[ Browse ] [          ] [ Upload ]

Upload Documents From External Storage Device
This option allows you to upload documents from a storage device (e.g., hard disc drive, flash drive, SD card, etc.) connected to your computer.

[ Browse ] [          ] [ Upload ]

Fig. 7C

CHORI - Cataloging

My Account: Karl Ericsson

| Home | Current Catalog | Upload Documents | Edit Catalog Documents | Options |

Air_Conditioner_Manual.doc

Microsoft Word – Air_Conditioner_Manual.doc has been added from CHORI Document Management System

*Please specify metadata to be associated with this document*

Your Document

| Preview | File |

CHORI Air Conditioner
This manual is for purchase of CHORI Air Conditioner Model # 2271. Please refer to this manual when installing our Air

△ 1 ▽

Created: 01/30/2015
Last Modification: 02/16/2015
Pages: 536
Application: Microsoft Word
Type: .docx

[Edit]

Published Name: Air Conditioner Manual for Model #2271

Version No:

Author: Johann Aesir

Doc. Type: Book

Owner: CHORI Company

Comments: The CHORI Air Conditioner Manual is suitable ONLY for CHORI Air Conditioner Model #2271. Please do not use if for other models.

[Back]  [Cancel]  [Next]

Fig. 7D

CHORI - Cataloging

| Home | Current Catalog | Upload Documents | Edit Catalog Documents | Options |

My Account: Karl Ericsson

Air_Conditioner_Manual_2271.doc

Microsoft Word – Air_Conditioner_Manual.doc has been added from CHORI Document Management System

Your Document

| Preview | File |

CHORI Air Conditioner

This manual is made for the CHORI Air Conditioner Model # 2271. Please refer to this manual when installing our Air Conditioner.

▽ 1 △

Created: 02/19/2015
Last Modification: 02/19/2015
Pages: 537
Application: Microsoft Word
Type: .docx

[Edit]

Please specify printing finishing options for this document

Binding: Spiral

Color: Color # of sides: Double Side

Sheet Size: A4

Resolution (DPI): 600

Comments: When printing this document, please print in color. Otherwise, if it is printed in black and white, certain drawings will not be clear.

[Back] [Cancel] [Next]

Fig. 7G

CHORI - Cataloging

| Home | Current Catalog | Upload Documents | Edit Catalog Documents | Options |

My Account: Karl Ericsson

Air_Conditioner_Manual_2271.doc

Microsoft Word – *Air_Conditioner_Manual.doc* has been added from *CHORI Document Management System*

Your Document

Preview | File
--- | ---
CHORI Air Conditioner — This manual is made for the CHORI Air Conditioner Model # 2271. Please refer to this manual when installing our Air Conditioner. △ 1 ▽ | Created: 02/19/2015<br>Last Modification: 02/19/2015<br>Pages: 537<br>Application: Microsoft Word<br>Type: .docx<br>[ Edit ]

*Please specify access rights for this document*

Groups     CHORI     <u>Delete</u>
            AC Distributors     <u>Delete</u>

*+ Add More Groups*

Users:     JAesir     <u>Delete</u>

*+ Add More Users*

Disable: [ Yes ▼ ]

Subscriptions: [ Yes ▼ ]  [ Until 02/21/2015 ▶ ]

Comments: Please do not allow users to access this document before the 02/21/2015 since we might perform some revisions before then.

[ Back ]     [ Cancel ]     [ Next ]

Fig. 7H

CHORI - Cataloging

My Account: Karl Ericsson

| Home | Current Catalog | Upload Documents | Edit Catalog Documents | Options |

Please Review Your Document & Corresponding Settings

Air_Conditioner_Manual_2271.doc

Your Document

CHORI Air Conditioner

This manual is made for the CHORI Air Conditioner Model # 2271. Please refer to this manual when installing our Air Conditioner.

◁ 1 ▷

Preview

Folder Path

CHORI Company/Products/Manuals

File

Created: 02/19/2015
Last Mod: 02/19/2015
Pages: 537
Application: Microsoft Word
Type: .docx

*Metadata Specifications*

Published Name: Air Conditioner Manual for Model #2271
Version No: V1
Author: Johann Aesir
Doc. Type: Book
Owner: CHORI
Comments: The CHORI Air Conditioner Manual is suitable ONLY for CHORI Air Conditioner Model #2271. Please do not use if for other models.

*Finishing Options*

Binding: Spiral
Color: Color
# of sides: Double Side
Sheet Size: A4
Resolution (DPI): 600
Comments: When printing this document, please print in color. Otherwise, if it is printed in black and white, certain drawings will not be clear.

*Access Rights*

Groups: CHORI, AC Distributors
Users: JAesir
Disable: Yes, (Until 02/21/2015)
Subscriptions: Yes
Comments: Please do not allow users to access this document before the 02/21/2015 since we might perform some revisions before then.

[ Back ] [ Cancel ] [ Publish ]

Fig. 7J

CHORI - Cataloging

| Home | Current Catalog | Upload Documents | Edit Catalog Documents | My Account: Karl Ericsson Options |

Congratulations, Your Document Is Now In the Catalog!

Air_Conditioner_Manual.doc

Your Document | File
---|---
CHORI Air Conditioner | Created: 01/30/2015
This manual is made for the CHORI Air Conditioner Model # 2271. Please refer to this manual when installing our Air Conditioner. | Last Modi: 02/19/2015
 | Pages: 537
 | Application: Microsoft Word
 | Type: .docx

△ 1 ▽

Metadata Specifications

| | |
|---|---|
| Published Name: | Air Conditioner Manual for Model #2271 |
| Version No: | V1 |
| Author: | Johann Aesir |
| Doc. Type: | Book |
| Owner: | CHORI |
| Comments: | The CHORI Air Conditioner Manual is suitable ONLY for CHORI Air Conditioner Model #2271. Please do not use if for other models. |

Finishing Options

| | |
|---|---|
| Binding: | Spiral |
| Color: | Color |
| # of sides: | Double Side |
| Sheet Size: | A4 |
| Resolution (DPI): | 600 |
| Comments: | When printing this document, please print in color. Otherwise, if it is printed in black and white, certain drawings will not be clear. |

Access Rights

| | |
|---|---|
| Groups | CHORI AC Distributors |
| Users: | JAesir |
| Disable: | Yes, (Until 02/21/2015) |
| Subscriptions: | Yes |
| Comments: | Please do not allow users to access this document before the 02/21/2015 since we might perform some revisions before then. |

Folder Path

CHORI Company/Products/Manuals

[ Home ]   [ Upload More Files ]

Fig. 7K

CHORI - Cataloging

My Account: Karl Ericsson

| Home | Current Catalog | Upload Documents | Edit Catalog Documents | Options |

Welcome To The Groups Page

Group 1
(Documents accessible by AC Distributors)

RefrigeratorManual.doc

Air_Conditioner_Manual_2271.doc

Group 2
(Documents that are books)

RefrigeratorManual.doc

Air_Conditioner_Manual_2271.doc

Financial_Records_2014.ppt

Employee_Rules.pdf

Create A New Group

Back

Fig. 9B

CHORI - Cataloging

My Account: Karl Ericsson

| Home | Current Catalog | Upload Documents | Edit Catalog Documents | Options |

Welcome To The Groups Page

Group 1
*(Documents accessible by AC Distributors)*

RefrigeratorManual.doc

Air_Conditioner_Manual_2271.doc

Group 2
*(Documents that are books)*

RefrigeratorManual.doc

Air_Conditioner_Manual_2271.doc

Financial_Records_2014.ppt

Employee_Rules.pdf

Disabled Documents
*(Documents that have been disabled until 02/21/2015)*

Air_Conditioner_Manual_2271.doc

Advertisment_Air_Conditioner_2271.djvu

CHORI Company
*(Documents belong to CHORI Company)*

Air_Conditioner_Manual_2271.doc

Financial_Records_2014.ppt

Employee_Rules.pdf

[Create A New Group]  [Back]

Fig. 9D

CHORI - Cataloging

My Account: Karl Ericsson

| Home | | Current Catalog | | Upload Documents | | Edit Catalog Documents | | Options |

Edit/Update Your Document

Air_Conditioner_Manual_2271.doc

Metadata Specifications

Published Name: Air Conditioner Manual for Model #2271
Version No: V2
Author: Johann Aesir
Doc. Type: Book
Owner: CHORI
Comments: The CHORI Air Conditioner Manual is suitable ONLY for CHORI Air Conditioner Model #2271. Please do not use if for other models.

Your Document | File

CHORI Air Conditioner
This manual is made for the CHORI Air Conditioner Model # 2271. Please refer to this manual when installing our Air Conditioner.

△ 1 ▽

Created: 02/19/2015
Last Mod: 02/26/2015
Pages: 600
Application: Microsoft Word
Type: .docx

[ Preview ]

Finishing Options

Binding: Stitching
Color: Gray Scale
# of sides: Double Side
Sheet Size: 8.5 x 11
Resolution (DPI): 600
Comments:

Access Rights

Groups: CHORI, AC Distributors
Users: JAesir
Disable: No
Subscriptions: Yes
Comments:

Folder Path

CHORI Company/Products/Manuals

[ Cancel ] [ Publish as Edit ] [ Publish as Update ]

Fig. 11B

RICOH

| Home | New Orders | In Production | QA Check | Pickup/Deliver | Completed | Materials |

Document Search: [         ]    My Order: [   ▽   ]

ACME Printing *(Manhattan Store)*    Print Center: US – NY – New York – ACME Printing – Manhattan Store Welcome to your print center's home page. From here you can obtain an overview of orders in various stages of completion that have been sent to you. You can access a listing of orders at each stage by clicking below or choosing a queue from the navigation tabs above.

New Orders
Perform a new order of documents located in our catalog

Orders In Production
This queue contains orders that you have accepted and are currently being produced.

Quality Assurance Check
This queue contains orders that must be carefully reviewed to ensure quality and customer satisfaction.

Order Ready To Pick Up/Deliver
This queue contains orders that are complete and awaiting pickup or delivery.

6

3

8

Completed Orders
Start here to browse an archive of all orders completed by you print center.

[ Browse Complete Orders ]

[ Browse Cancelled Orders ]

Order Search

Order Number: [        ]

Customer Name: [        ]

[ Search ]

RICOH

| Home | New Orders | In Production | QA Check | Pickup/Deliver | Completed | Materials |

Document Search: [____]

My Order: [____]

ACME Printing *(Manhattan Store)*  Print Center: US – NY – New York – ACME Printing – Manhattan Store

Review Order Summary

Your Document

| Preview | Specification |
|---|---|
| CHORI Air Conditioner – This manual is for purchase of CHORI Air Conditioner Model # 2271. Please refer to this manual when installing our Air ▽ 1 △ | 8.5 x 11 |
| | Double-Side, B&W |
| | White |
| | Spiral Binding |

Recipient Information

| Name & Address |
|---|
| Craig Daily |
| AC Distributors – Accounting |
| 718 42nd Street |
| New York, NY 11101 |
| (212) 556-3243 |
| CDaily@acdistributors.com |

Payment Information

Billing Account Information:
 Cost Center: 345454
 Purchase Order: Z32435

Total: 10.75

[ Place Order ]

Fig. 13D

PRODUCTION PRINTING SYSTEM WITH DOCUMENT MANAGEMENT INTERFACE

TECHNICAL FIELD

This disclosure relates to production printing systems, apparatuses and methodologies, and more specifically, to such systems, apparatuses and methodologies that include a generic interface for document management and/or document access.

BACKGROUND

In the current information age, information technology (IT) tools play a significant role in our daily activities, and there are often discussions of the desirableness of a paperless society. However, notwithstanding such discussions, there remains a need by users of computers and other information terminals (such as smartphones, PDAs, other information appliances, etc.) for printing functionality. Devices having printing or plotting functionality, such as printers, copiers, multi-function devices, etc., continue to play a significant role at home, at work and even elsewhere.

There are circumstances in which production print facilities and/or services are employed for high-quality output and/or large volume output. While such facilities and/or services are often provided by brick-and-mortar businesses, the source documents are often uploaded through an electronic storefront or portal via a network to the production print facility or service.

Further, while in many instances the source documents are generated and/or controlled by the production print consumer, there are also many other instances in which the source documents are shared by a pool of users or consumers. In this latter circumstance, the source documents is typically maintained by someone other than the user or consumer, such as in a catalog, a document management system, or the like. In, for example, the case that the source documents are maintained by a third party (i.e. other than the consumer or the production printing facility or service) in a document management system, it is not a trivial matter for upload of the source documents from the document management system to the production print facility or service. In the typical circumstance, a customized interface is needed for such upload from the document management system to the production print system, and access for upload and otherwise must be controlled in a secure manner. Such requirement is cumbersome and costly since there are numerous third party document management systems.

SUMMARY

In the case of a production printing system providing facilities that permit users to upload documents and/or specify print jobs from external to the production printing system and that permits a production-side provider to download and execute production of an uploaded job, such production printing system can be configured to include a catalog of catalog items available for specified production, in addition to the user-uploaded print jobs. In order to alleviate the burden of the system administrator to maintain the documents in the catalog, a generic interface can be provided in the system and configured for upload of documents to the catalog, by a third party. Once uploaded, each item in the catalog is available for order by an authorized user of the system, for production. The generic interface enables any of various authorized third parties to publish documents to the catalog from any of various document management systems which are external to the production printing system and may have respective different document organization schemas.

Such system may include a Web-based user interface through which any of users, third parties and the production-side provider can access the production printing system, upon login and authentication. Upon publication of an item by the third party to the catalog, the third party is permitted via the generic interface to modify the published item or item settings via the Web-based user interface, so that such tasks need not bee performed by the system administrator and/or a designee of the production-side provider. As another option, upon publication of an item by the third party to the catalog, the third party may be permitted via the generic interface to replace the published item in the catalog with an updated version of the item. A workflow of the third party may be facilitated by permitting the third party, via the generic interface, to create a new item to be added to the catalog, by retrieving a document from a source document management system external to the production printing system and modify the document and/or specify item settings, via the Web-based user interface.

In another aspect, the generic interface may be configured to permit a third party to specify an organizational structure of and/or organize, plural items added to the catalog by the third party. For example, the generic interface may be configured to permit the third party to add items from a source document management system external to the production printing system to the catalog in an organization structure different to the organization structure already employed in the source document management system and/or the organization structure of items already in the source document management system. As another example, the generic interface may be configured to permit the third party to specify that the items are to be organized in the catalog according to specified criteria.

In other aspects, the generic interface may be configured to permit the third party to specify access rights for the items added to the catalog, such as by specifying user name and/or group name, and/or to modify a published item or item settings, and/or to check out or disable an item added to the catalog by the third party, and/or to specify meta data in addition to the document to be published in the catalog, and/or to modify meta data associated with an item added to the catalog by the third party, and/or to modify production options associated with an item added to the catalog by the third party, and/or to add a subscription option to an item added to the catalog by the third party.

BRIEF DESCRIPTION OF THE DRAWINGS

The aforementioned and other aspects, features and advantages can be more readily understood from the following detailed description with reference to the accompanying drawings wherein:

FIG. 2A shows a schematic diagram of an exemplary configuration of communication between a production printing system and a document management system;

FIG. 2B shows an access rights table, according to an example;

FIGS. 7A-7K show examples of user interface screens that can be provided in any of the production printing systems shown in FIGS. 1A, 1B and 2A;

FIGS. 9A-9D show examples of user interface screens that can be provided in any of the production printing systems shown in FIGS. 1A, 1B and 2A;

FIGS. 11A and 11B show examples of user interface screens that can be provided in any of the production printing systems shown in FIGS. 1A, 1B and 2A;

FIGS. 13A-13D show examples of user interface screens that can be provided in any of the production printing systems shown in FIGS. 1A, 1B and 2A.

DETAILED DESCRIPTION

Figure 1A:
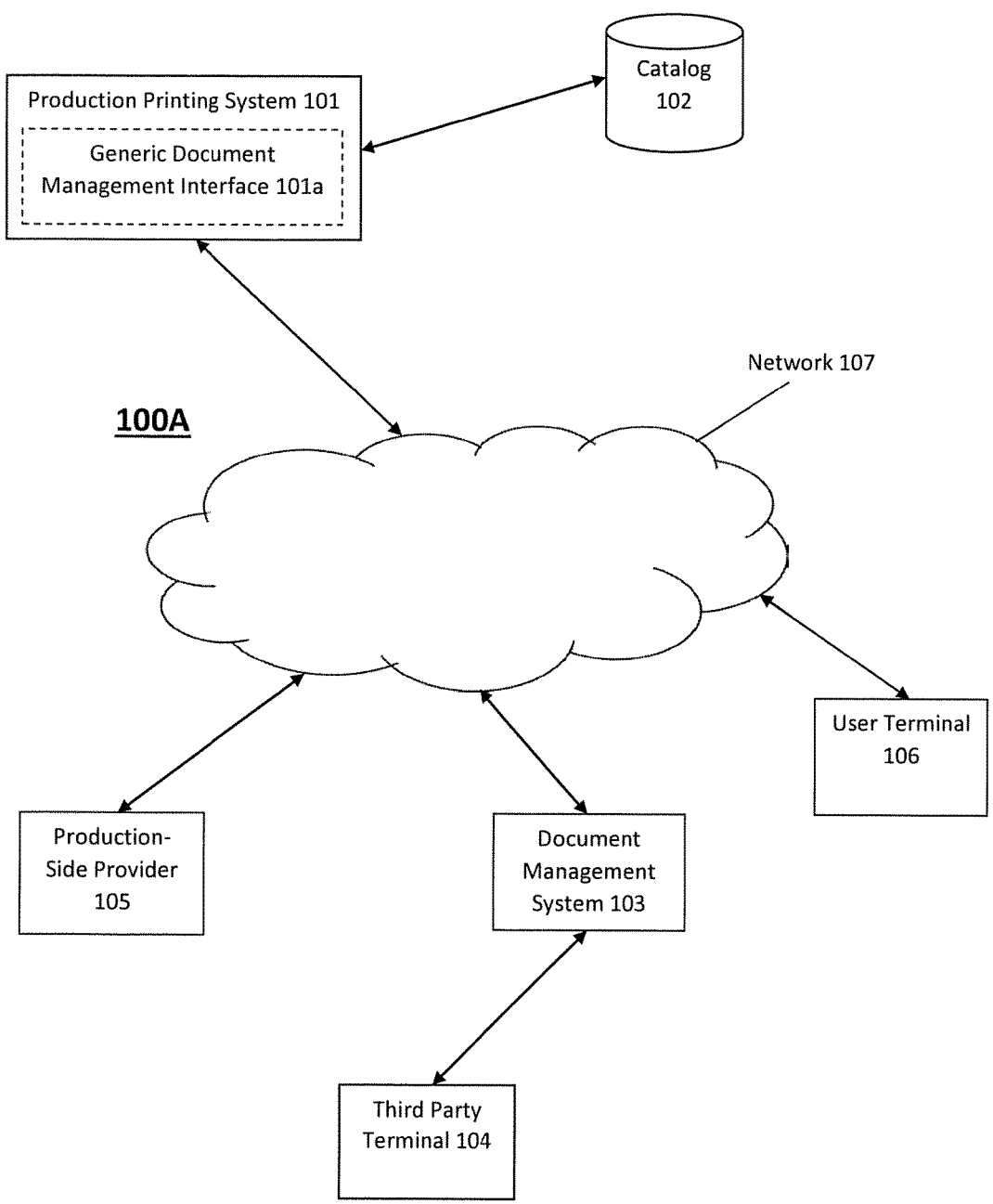
FIG. 1A shows a block diagram of a system including a production printing system, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Various tools are discussed herein to facilitate document management and/or document access in a production printing system. It should be appreciated by those skilled in the art that any one or more of such tools may be embedded in a production printing system and/or provided as an application to a terminal and/or in any of various other ways and thus while various examples are discussed herein, the inventive subject matter of this disclosure is not limited to such examples described herein.

Referring now to the drawings, wherein like reference numerals designate identical or corresponding parts throughout the several views, FIG. 1A shows schematically a system 100A that includes a production printing system 101, a catalog database 102, a document management system 103, a third party terminal 104, a production-side provider 105 and a user terminal 106. The production printing system 101, the document management system 103, the production-side provider 105 and the user terminal 106 are interconnected by a network 107. In the example shown in FIG. 1A, the catalog database 102 is schematically coupled to the production printing system 101. However, it should be appreciated that the catalog database may be configured to be network-connected and that the production printing system 101 may alternatively communicate with the catalog database through the network 107. Likewise, the third party terminal 104, instead of being directly connected to the document management system 103, may alternatively communicate with the document management system through the network 107.

The production printing system 101 may provide any, or any combination, of various print and print-related services to users to allow the users to upload and compile print jobs (and optionally to edit or modify the uploaded print jobs) to the production printing system 101 from outside (e.g., via the document management system 103) the production printing system 101. After receiving said print jobs, the production printing system 101 notifies the production-side provider 105 as to the print job.

In addition, the production printing system 101 provides a user interface for third party users to upload documents and other printable content to the catalog database 102. Such documents and content (e.g., files, images, other printable media, etc.) may be in a variety of file formats (e.g., pdf, doc, docx, DjVu, GIF, bitmap, etc.) and the uploaded items in the catalog may be made available for access to all, or a limited subset, of users accessing the production printing system 101. In other words, the documents or content may be published by the production printing system 101 as items for access in the catalog.

The generic document management interface 101a provides a generic interface to allow the document management system 103 to communicate with the production printing system 101 in order to, for example, upload documents from the document management system 103 to be stored in the catalog database 102. In this case, the third party may be an organization, business or individual who may have made an agreement (e.g., contract) with the owner (e.g., organization, business, individual, etc.) of the production printing system 101, in which, for example, the third party user may upload various documents (e.g., photographs, brochures, books, advertisements, product manuals) to be stored in the catalog database 102. As a result of this configuration, users (e.g., customers) may search for a particular document to print in the catalog database 102 without having to communicate with the third party user to obtain the particular document.

It should be noted that the generic document management interface 101a is not customized (or can only communicate with) for a single third party user. In other words, the generic document management interface 101a is built in such a way that any developer associated with the third party user can modify the document management system to communicate with the generic document management interface 101a.

The generic document management interface 101a may, for example, be in the form of an application programming interface (API). An API is a set of routine, protocols and tools for accessing a particular software. In other words, the production printing system 101 may require specific inputs to perform an action (or a function) and may output data in a format that is only understandable to the production printing system 101. Thus, the generic document management interface 101a, for example, as an API, may bridge the gap between the document management system 103 and the production printing system 101 by, for example, converting instructions sent from the document management system 103 into a format that is understandable to the production printing system 101 or, in the reverse direction, convert data sent from the production printing system 101 into a format that is understandable to the document management system 103.

Likewise, as stated previously, it should be noted that the generic document management interface 101a is not customized (or can only communicate with) for a single third party user or, in this case, a document management system. In other words, as long as the developer associated with the third party has access to API documentation of the production printing system 101, the developer can customize (or configure) an existing document management system by, for example, adding new lines of code or a module to allow the document management system to communicate with the generic document management interface 101a and, ultimately, with the production printing system 101.

Further, while the method and protocols for accessing the generic document management interface 101a may be the same for all third party users, the functionalities provided by the production printing system 101 may not be accessible to all third party users. For example, one third party user may be able to upload documents to be stored in the catalog database 102 that are only less than a certain size (e.g., 1 GB) while another third party user may upload documents that are more than 1 GB. In another example, one third party user may be unable to save multiple versions of a single document while another third party can save multiple versions of a single document.

The catalog database 102, connected to the production printing service apparatus 101, stores a plurality of documents in different file formats (e.g., pdf, doc, docx, DjVu, GIF, bitmap, etc.) uploaded by a third party. Such catalog database 102 may be divide into one or more sections that correspond to a single third party user. For example, a third party user called "Populaire Corporation" may be allocated a section while another third party user "Banco Company" may be allocated multiple sections.

The document management system 103 is a system for managing various documents (e.g., photographs, brochures, books, advertisements, product manuals) that are associated with the third party user. The document management system 103, may, for example, include one or more servers that are interconnected via a network (e.g., LAN, WAN, Internet, etc.), store a plurality of documents (e.g., files, media, images, documents, etc.) and is accessible by a plurality of users. Further, the document management system may allow users to upload, modify or delete documents to the document management system. In addition, the document management system may also allow users to organize documents into groups.

The third party terminal 104 can be any computing device, including but not limited to a personal, notebook or workstation computer, a mobile phone or handset, another information terminal, etc., that can communicate with other devices through the network 107. The third party terminal 104 is further described infra with reference to FIG. 4.

The third party terminal 104 is connected to the document management system 103 thereby allowing a user of the third party terminal 104 (i.e. third party user) to access and organize content on the document management system 103. For example, the user of the third party terminal 104 may upload documents to be stored on the document management system 103 or organize existing documents by grouping them. Further, in the case that the document management system 103 is shared by a plurality of third party users who are all part of the same organization, the user of the third party terminal 104 may, subject to access rights, view documents uploaded by other third party users. In addition, the user of the third party terminal 104 may access printing services offered by the document management system 103, in which the user of the third party terminal 104 may print documents stored on the document management system 103.

Further, the user of the third party terminal 104 may access, via the document management system 103, the production printing system 101, for uploading one or more documents currently stored on the document management system 103 to the catalog database 102. For example, the user of the third party terminal 104 may select to upload sets of documents to be published for any persons to view.

Figure 3:
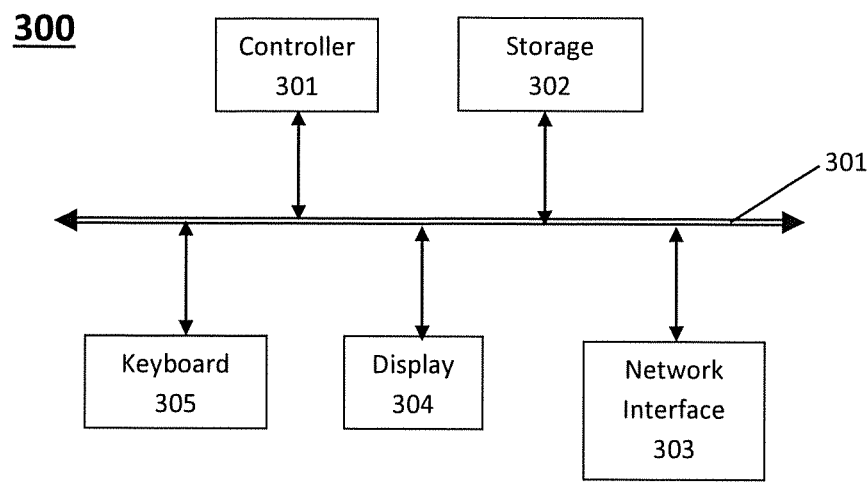
FIG. 3 shows a block diagram of an exemplary configuration of a computing device that can be configured by software to constitute a production printing system (such as referenced in FIGS. 1A, 1B and 2A)
Figure 4:
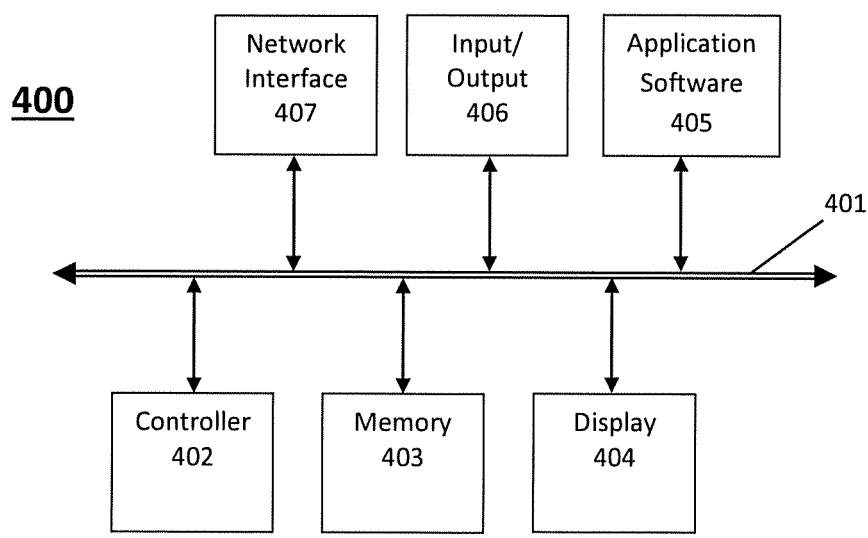
FIG. 4 shows a block diagram of an exemplary configuration of a terminal that can constitute a user terminal or third party terminal.
Figure 5:
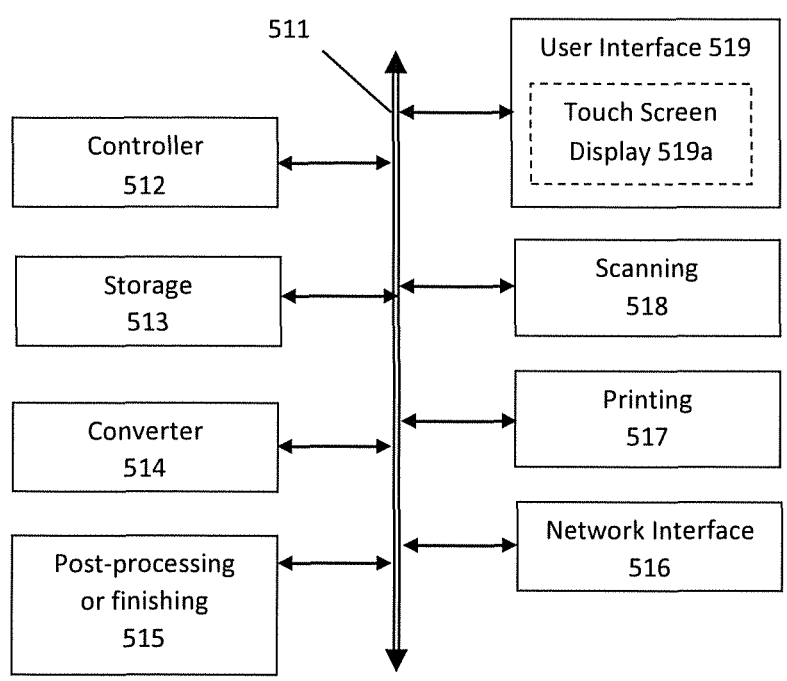
FIG. 5 shows a block diagram of an exemplary configuration of a multi-function device that can constitute a production printing device.

The production-side provider 105 may be a computer (configured such as shown in FIG. 3 or in FIG. 4, or to have another conventional configuration) coupled to a production printing device (typically, having multi-function capabilities, such as shown in FIG. 5, or having another conventional configuration) and employed by an organization, business or individual, to receive orders from the production printing system 101 to perform print jobs that have been submitted by users through a terminal (e.g., user terminal 106) to the production printing system 101. For example, users may send a request via his or her terminal (e.g., user terminal 106) to print out one or more documents that may be in various file formats (e.g., pdf, doc, docx, DjVu, GIF, bitmap, etc.) in a specified print format (e.g., stapling, double-sided, color, black-and-white, etc.) to the production printing system 101 which, in response, forwards the request to the production-side provider 105. When the request is received, the production-side provider 105 may review the print job and then print said documents in the specified print format requested by the user by one or more appropriate printers included in the production-side provider 105. Afterwards, the production-side provider may send (e.g., by mail) the finished print job to the user who requested the print job.

The user terminal 106 can be any computing device, including but not limited to a personal, notebook or workstation computer, a kiosk, a mobile phone or handset, another information terminal, etc., that can communicate with other devices through the network 107. The user terminal 106 is further described infra with reference to FIG. 4. The user terminal 106 can access the catalog 102 provided by the production printing system 101a to allow a user of the user terminal 106 to select a document stored in the catalog 102 and send a request to print such document, to the production-side provider 105 which in turn performs the print job and sends the completed print job back to the user of the user terminal 106.

The network 107 can be a local area network, a wide area network or any type of network such as an intranet, an extranet (for example, to provide controlled access to external users, for example through the Internet), a private or public cloud network, the Internet, etc., or a combination thereof. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
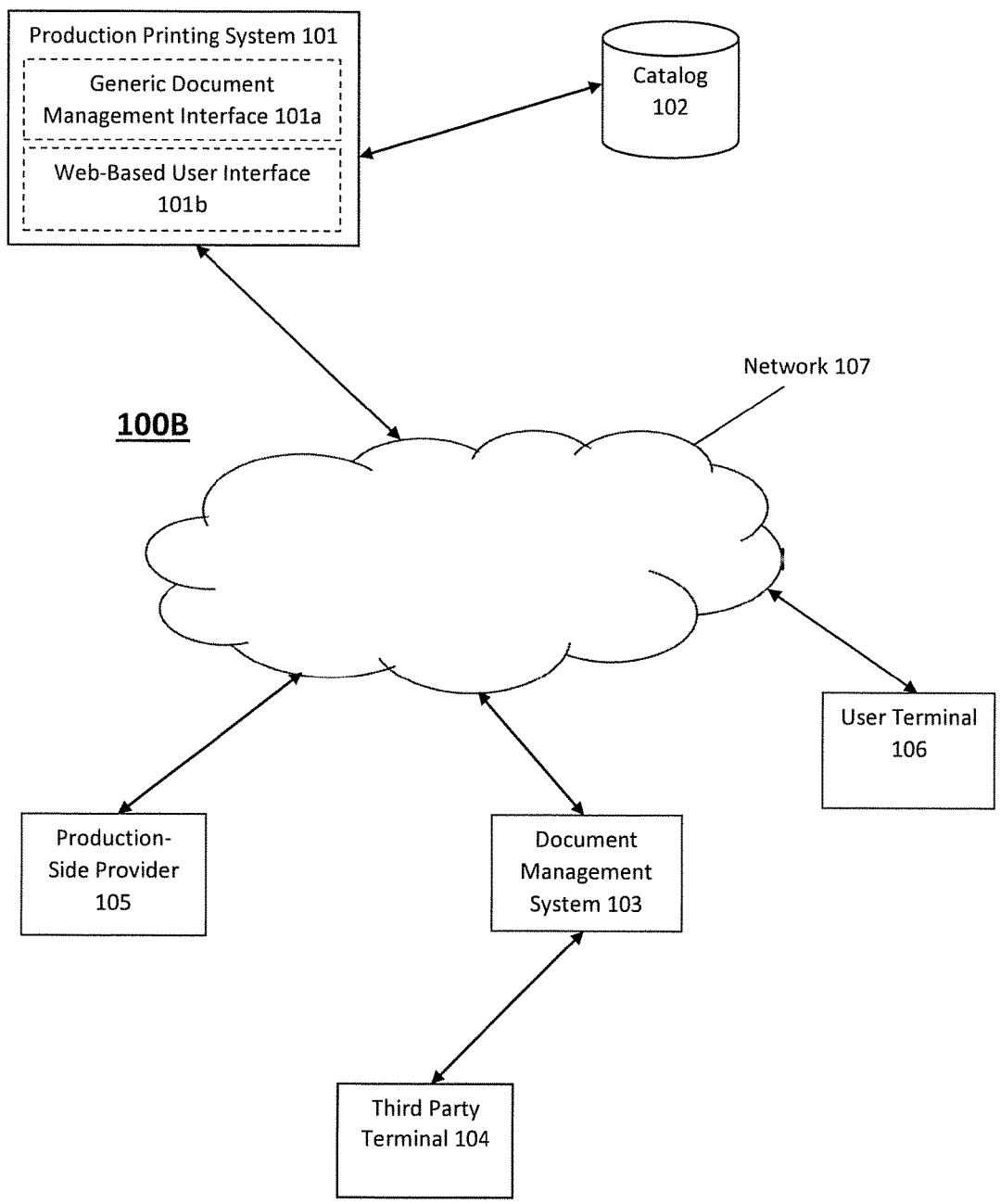
FIG. 1B shows a block diagram of a system including a production printing system, according to another exemplary embodiment.

FIG. 1B shows schematically a system 100B, according to another exemplary embodiment. The system 100B is similar to the system 100A of FIG. 1A except that a Web-based user interface 101b is provided in the production printing system 101 to allow the user to access the features offered by the production printing system 101 via a graphic user interface (GUI) supplied to a web browser on a terminal. For example, when a third party user, production-side provider 105 or a user accesses the printing production system 101, they are presented with the Web-based user interface 101b sent by the printing production system 101 over a network (e.g., network 107). Such Web-based user interface 101b may also authenticate a user who is logging into the production printing system 101.

However, as mentioned above, it is not a limitation that the user interface is provided through a web browser. Instead, the user interface may be provided through the network 107

Otherwise, operations of the elements of the system 100B are similar to those discussed in connection with the corresponding elements of the system 100A of FIG. 1A.

FIG. 2A is an example of a block diagram illustrating in detail how a communication is performed between a document management system 201 (e.g., similar to document management system 103) and a production printing system 202 (e.g., similar to production printing system 101). The document management system 201 includes a document management interface 201a which is customized by a developer who is associated with a third party, to allow the document management system 201 to interact and communicate with the production printing system 202. The production printing system 202 includes (1) a production printing software 202b which performs print and print related services and (2) a generic document management interface which is a generic interface (e.g., includes generic communication formats) that allows the production printing system 202 to communicate with any document management system that includes a document management interface that is customized to communicate with the generic document management interface.

For example, the owner of the production printing system 202 may provide to one or more third parties API documents/manuals detailing the routine, protocols and rules for interacting with the generic document management interface 202a. In other words, the API documents/manuals may contain instructions on functions/actions that the generic document management interface 202a can perform (the third party having limited access to the functions/actions), what data formats, strings or signals that is accepted by the generic document management interface 202a as inputs, and what outputs are generated by the generic document management interface 202a. The third party may review the API documents/manuals and create a new document management interface or customize existing document management interface based on said API documents/manuals thereby producing the document management interface 201a which can communicate with the production printing system software 202b via the generic document management interface 202a. It should also be noted that the customization can also be performed by the owner of the production printing system 202 on behalf of the third party.

An example of such communication commences when a user of a terminal (e.g., third party terminal 104) requests that the document management system 202 perform a specific action (instruction from user 2A). In response, the document management system 202 sends a request (via the document management interface 201a) corresponding to the specific action (instruction or data 2B) to the production printing system 202 in a format that is acceptable to the generic document management interface 202a.

An example of such a format may be a uniform resource locator (URL). The order in which symbols and characters are placed in the URL allows the generic document management interface 202a to parse the URL to obtain information and instructions. For example, the generic document management interface 202b may send a URL "www.ricoh.com/server2/return_document/computer_manual/field=name" to the production printing system 202 which is received initially by the generic document management interface 202a. The generic document management interface 202a may parse the URL to obtain instructions to return (e.g., "return_document") a name (e.g., "field=name") of a document named "computer_manual" ("e.g., computer_manual") from a server 2 (e.g., "server2").

Next, after the generic document management interface 202b verifies that the action requested is valid, the generic document management interface 202b may convert the received instructions (instruction or data 2B) into a format that is acceptable by the production printing software 202b. Such converted instructions (converted instruction or data 2C) are sent to the production printing system software 202b which processes the requested action and may output a response (instruction or data 2D) including data corresponding to the request or an instruction (e.g., asking for more data to assist in complying with the request) to the document management system 201 via the generic document management interface 201a. Such instruction or data is converted by the generic document management interface 201a into a format that is acceptable to the document management system interface 201a.

In an exemplary embodiment, the format may not be a URL and may be another communication format instead (e.g., SMNP, SSH, Telnet, UDP, TCP, etc.). In other words, the request or data sent by the document management system interface 201a may be in one format (e.g., URL) while any data or instructions received from the generic document management interface 202a may in another format (e.g., SMNP, Telnet, etc.).

After the document management interface 201a receives the converted instructions or data (converted instruction or data 2E) from the generic document management interface 201a, the document management interface 201a processes the converted instructions or data into a format that is acceptable by the document management system 201. In response the document management system 201 either displays the data to the user (output to user 2F) or processes the instruction or data to respond back to the production printing system 202 without notifying the user.

FIG. 2B is a table illustrating access rights for a third party, a production-side provider and a user. When each of the third party, the production-side provider and the user log in to a production printing system, each may have different degrees of access to documents stored in a catalog associated with the production printing system. For example, third party users can access and modify documents (e.g., access rights, metadata, finishing options, etc.) that said third party users had published. On the other hand, a user can access any document that has been deemed accessible to user by the third party. Further, the production side-providers can only access documents sent for printing and cannot modify documents.

FIG. 3 shows an exemplary constitution of a computing device that can be configured (for example, through software) to operate (at least in part) as the production printing system 101, the document management system 103, or the production-side provider 105 of FIG. 1A or FIG. 1B. As shown in FIG. 3, apparatus 300 includes a controller (or central processing unit) 501 that communicates with a number of other components, including memory or storage part 302, network interface 303, display 304 and keyboard 305, by way of a system bus 309. The apparatus 300 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management apparatus 300, the controller 301 executes program code instructions that control device operations. The controller 301, memory/storage 302, network interface 303, display 304 and keyboard 305 are conventional, and therefore in order to avoid obfuscating the inventive aspects of this disclosure, such conventional aspects will not be discussed in detail herein.

The management apparatus 300 includes the network interface 303 for communications through a network, such as communications through the network 107 with the third party terminal 104 or the user terminal 106 in FIG. 1A or FIG. 1B. However, it should be appreciated that the subject matter of this disclosure is not limited to such configuration. For example, the apparatus 300 may communicate with client terminals through direct connections and/or through a network to which some components are not connected. As another example, the apparatus 300 does not need to be provided by a server that services terminals, but rather may communicate with the devices on a peer basis, or in another fashion.

The apparatus 300 of the present disclosure is not limited to a server or computer, but can be manifested in any of various devices that can be configured to communicate over a network and/or the Internet.

An exemplary constitution of the third party terminal 104 and the user terminal 106 of FIG. 1A (for example, as a computer) is shown schematically in FIG. 4. In FIG. 4, computer 400 includes a controller (or central processing unit) 402 that communicates with a number of other components, including memory 403, display 404, application software 405, input/output (such as keyboard, mouse, touchpad, stylus, microphone and/or speaker with voice/speech interface and/or recognition software, etc.) 406 and network interface 407, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 407 provides a connection (for example, by way of an Ethernet connection or other network connection which supports any desired network protocol such as, but not limited to TCP/IP, IPX, IPX/SPX, or NetBEUI) to the network to which the computer 400 is connected (e.g., network 107 of FIG. 1A).

Additional aspects or components of the computer 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 5 shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities. The MFP 500 shown in FIG. 5 includes a controller 512, and various elements connected to the controller 512 by an internal bus 511. The controller 512 controls and monitors operations of the MFP 500. The elements connected to the controller 512 include storage 513 (for example, random access memory, read-only memory, hard disk drive, portable storage media drive such as for optical discs, magnetic discs, magneto optical discs, etc., semiconductor memory cards, combinations of storage media, etc.), a converter 514, post-processing (e.g., stapling, punching, sorting, folding, binding, etc.) 515, a network interface (I/F) 516, printing 517, scanning 518 and a user interface 509.

Storage 513 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 513 and executed by the controller 512 to carry out the instructions. Such instructions can include instructions for performing specified functions (such as printing, scanning, faxing, copying, e-mailing, etc.) of the MFP 500, to enable the MFP 500 to interact with a terminal, as well as perhaps other external devices, through the network interface 516, and interactions with users through the user interface 519.

The network interface 516 is utilized by the MFP 500 to communicate with other network-connected devices such as a terminal, a server and receive data requests, print jobs, user interfaces, and etc.

The user interface 519 includes one or more electronic visual displays that display, under control of controller 512, information allowing the user of the MFP 500 to interact with the MFP 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 500, so as to allow the operator to interact conveniently with services provided on the MFP 500, or with the MFP 500 serving as terminal for accessing electronic data or other content through the network. User interfaces or other contents received through the network via the network interface 516 can be displayed on the display screen.

The display screen does not need to be integral with, or embedded in, a housing of the MFD 500, but may simply be coupled to the MFD 500 by either a wire or a wireless connection. The user I/O 519 may include keys and/or buttons (such as graphical keys or buttons, or other graphical elements, of a GUI on a touchscreen display 519a) for inputting information or requesting various operations. Alternatively, the user I/O 519 and the display screen may be operated by a keyboard, a mouse, a remote control, voice recognition, or eye-movement tracking, or a combination thereof.

Since the MFD 500 is typically shared by a number of users, and is typically stationed in a common area, the MFD 500 preferably prompts the user to supply login credentials or authentication information, such as user name (or other user or group information), password, access code, etc. The user credentials may also be stored for the session and automatically supplied if access to other devices through the network requires it. On the other hand, such other devices may prompt the user to supply other user credentials through the user interface.

Other methods of authentication may also be used. For example, the MFD 500 may be equipped with a card reader or one or more biometrics means (such as comparing fingerprints, palm prints, voice or speech, retinas or irises, facial expressions or features, signature, etc.). The MFD 500 may communicate the user credentials, provided in the manners discussed above, to other devices or applications connected to the MFD 210 via a network (e.g., the network 107 of FIG. 1A and FIG. 1B) for determining authorization for performing jobs.

Scanning 518, printing 517, and network interface 518 are otherwise conventional, and therefore, a detailed description of such conventional aspects is omitted in the interest of clarity and brevity. The MFP 500 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 6:
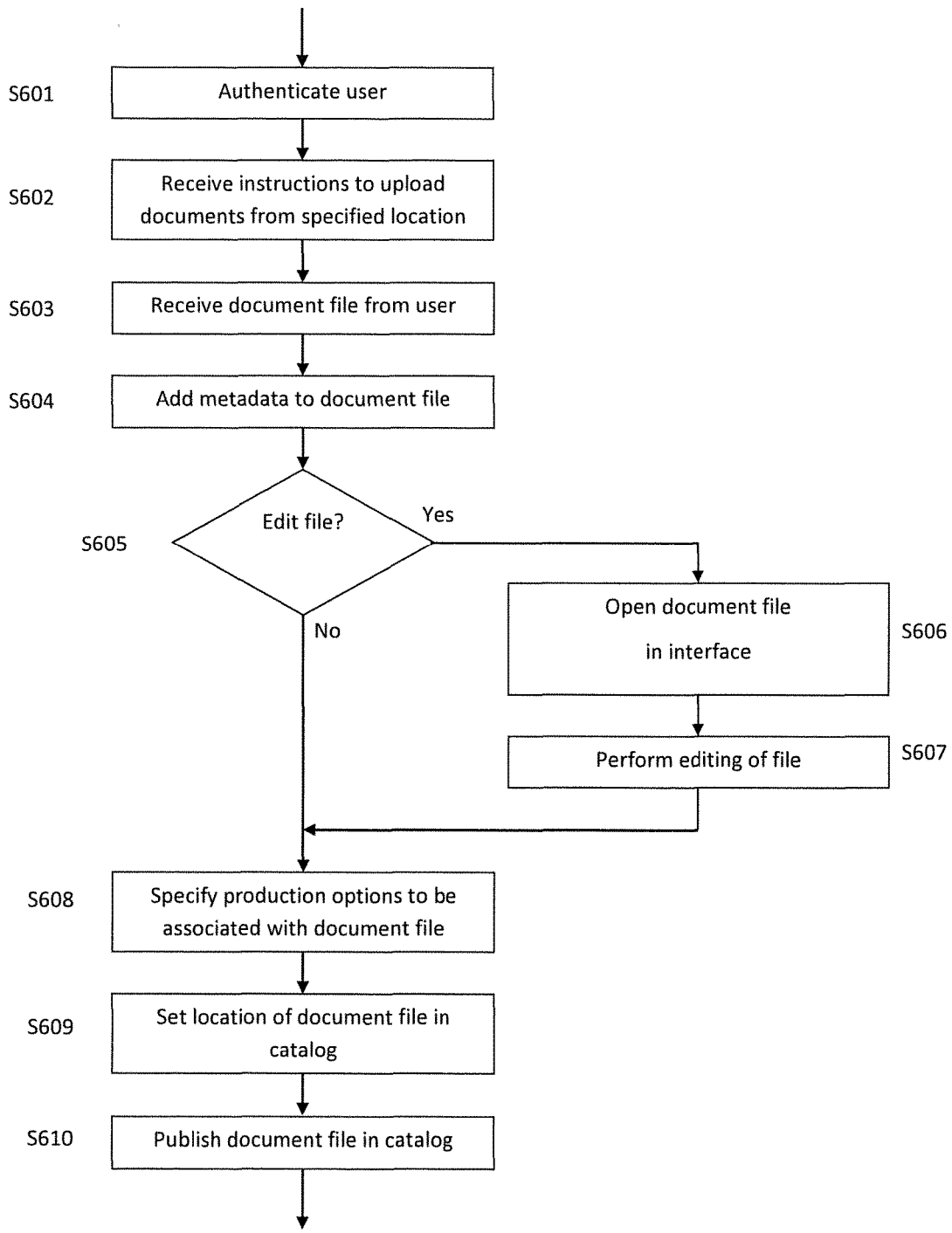
FIG. 6 shows a flow chart of a workflow to publish documents to a catalog in any of the production printing systems shown in FIGS. 1A, 1B and 2A.

FIG. 6 show an event process or workflow performed by a production printing system (e.g., 101*a*), according to an exemplary embodiment.

In this exemplary scenario, a user ("Karl Ericsson") may be employed at a company ("CHORI Company") that produces air conditioners as a product which are to be sold wholesale to a distributor (e.g., "AC Distributors") who in turn sells them individually to consumers. The air conditioners may have a corresponding manual in order to help customers who buy such air conditioners set up or repair them. For cost reasons, the manual may not be produced physically by "CHORI Company" to be included with each air conditioner. Instead, "CHORI Company" may instead place an electronic copy of the manual onto a catalog associated with a production printing system (e.g., production printing system 101) in order to allow their distributors (e.g., "AC Distributors") or the customers to easily obtain and print the manual. Further, such production printing system may be owned by another company (e.g., Ricoh Corporation) which has an agreement (e.g., contract) to allow "CHORI Company" to access and upload items to the catalog.

Figure 7A:
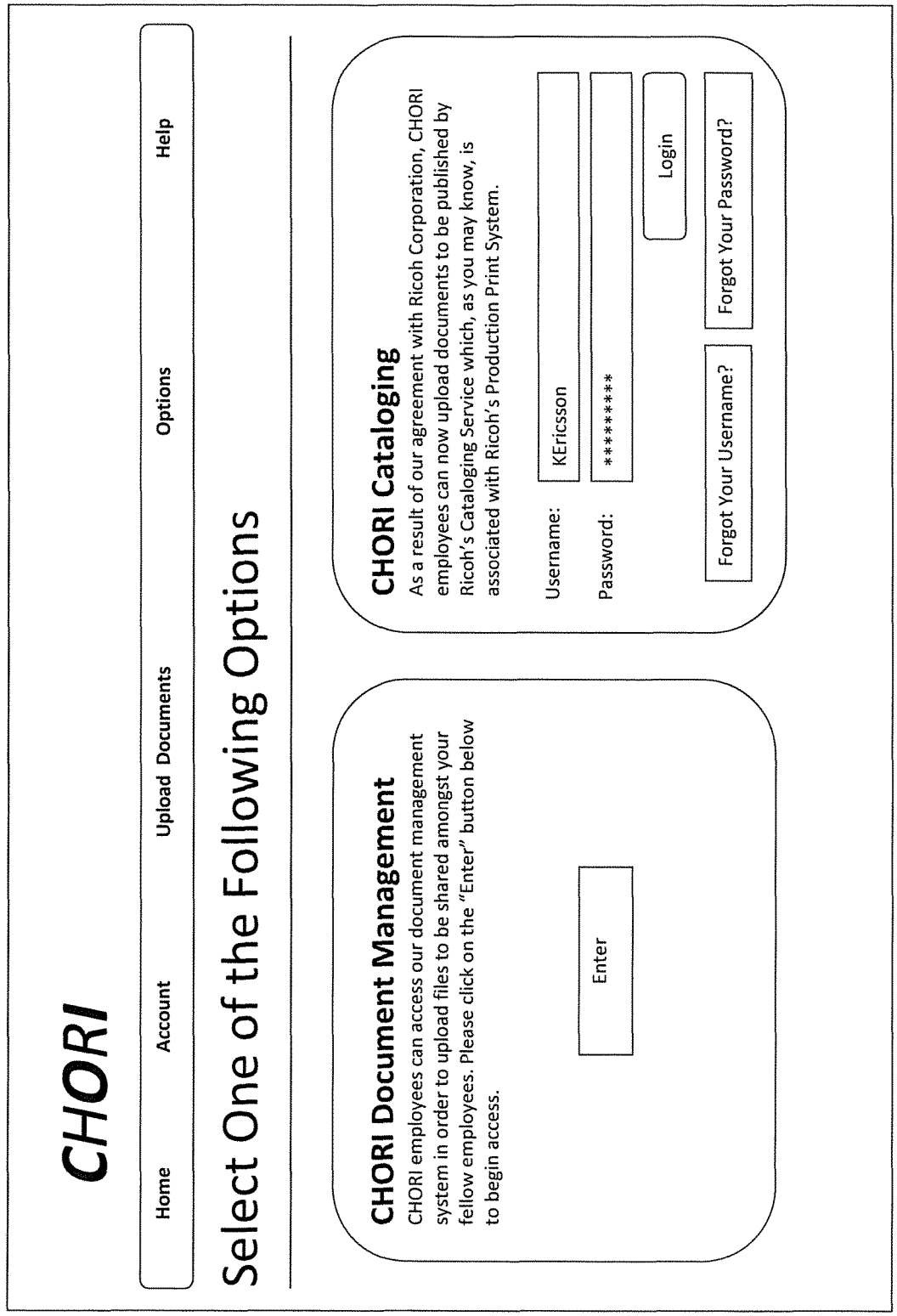

Such process commences when the user accesses a document management system (e.g., document management system 103), such as via the user interface shown in FIG. 7A. In this case, the document management system may store items (e.g., electronic documents, images, etc.) that are created by the user or fellow employees of the user. Further, the document management system may also be configured to access the production printing system owned by another company (e.g., "Ricoh Corporation") via a generic document management interface. In other words, the document management system may be modified or configured to be able to send requests in a format understandable to the generic document management interface which then converts such request into a format understandable to the production printing system and communicates the converted request to the production printing system. Likewise, the reverse also includes a similar process in which data or instructions sent from the production printing system is received by the generic document management interface which than proceeds to convert said data or instructions into a format understandable to the document management system.

In one example, a developer in the employment of or hired by "CHORI Company" may modify the existing document management system of "CHORI Company" to be able to access the production printing system owned by "Ricoh Corporation" by obtaining documentation explaining an API of the generic document management interface associated with the production printing system. In another example, a developer from "Ricoh Corporation" may modify the existing document management system of "CHORI Company" or create an entirely document management system, instead, to interact with the generic document management interface associated with the production printing system owned by "Ricoh Corporation".

After the user opens the document management system, he or she logs into the cataloging service associated with the production printing system by inputting user credentials (step S601). These user credentials may include a username and password. It should be noted that the user can be presented with other alternative options such as fingerprint reading or retina scanning for inputting user credentials. After the user has been authenticated, the document management system communicates with the production printing system via a generic interface and causes a screen containing several options in the form of buttons (e.g., "Upload Documents", "View Current Catalog", "Edit Catalog Documents", "Create Documents", etc.) to be presented to the user, such as shown in FIG. 7B. In the "Upload Documents" option, the user may upload documents (e.g., files, images, media, etc.) to the catalog from a variety of locations (e.g., user computer, catalog, document management system, external storage device, etc.). In the "View Current Catalog" option, the user may view, subject to access rights, documents that are currently stored in the catalog. In the "Edit Catalog Documents" option, the user may edit, subject to access rights, documents on the catalog.

In this case, the user has selected to upload documents to be published in the catalog by activating the "Upload Documents" button. Next, the user is presented with one or more options for selecting the specified location from which the user is to obtain the document from (e.g., "My Computer", "CHORI Document Management System", "Catalog", "External Device", etc.), such as shown in FIG. 7C. The "My Computer" option allows the user to upload documents located on his or her computer (e.g., user terminal 106). The "CHORI Document Management System" option allows the user to upload documents from the document management system. The "Catalog" option allows the user to upload documents stored in the catalog. A user might perform uploading from the catalog in a scenario in which the user discovers a document that may be located in the catalog that is not owned by the user but is accessible by him or her (e.g., government tax forms). The user may want to upload such document to a location in the catalog that is owned by him or her. The "External Storage Device" option allows a user to upload documents from an external storage device (e.g., external hard disc drive, flash drive, SD card, etc.) which may be attached to his or her computer.

In this case, the user has selected to upload documents from the document management system (step S602). The user performs such uploading by activating a "Browse" button corresponding to the option for uploading documents from the document management system and searching for a document (e.g., file, images, etc.) located in the document management system. After the user has found such document (e.g., Air_Conditioner_Manual.doc), he or she uploads said document to the catalog by activating the "Upload" button (step S603). Next, a screen displaying a preview of the document and information corresponding to the document (e.g., creation date, last modification date, number of pages, original application used to create document, file type, etc.) and an option to specify additional metadata to be associated with the document is presented to the user (step S604), such as shown in FIG. 7D. Metadata is data which describes the document. In other words, metadata is information that is not shown in the document itself (e.g., in pages or image of document) but may be viewable by the user when he or she accesses properties of the document.

Although some metadata is already associated with the document (e.g., creation date, last modification date, number of pages, original application used to create document, file type, etc.), the user may specify more metadata to be included (e.g., published name, version number, author, document type, owner, comments, etc.) by entering information in corresponding metadata fields. For example, the user may specify a published name of the document. Such published name (e.g., "Air Conditioner Manual for Model #2271") may be displayed to users accessing the catalog instead of the document file name (e.g., "Air_Conditioner_Manual.doc)". In another example, the user may specify an author of the document. In this case, the author may be an independent contractor (e.g., "Johann Aesir") who was hired to write the air conditioner manual. In yet another example, the user may add comments to give information to other users accessing the document. It should be noted that the user is not required to enter additional metadata. In other words, the user may leave some of the metadata fields blank.

Figure 7E:
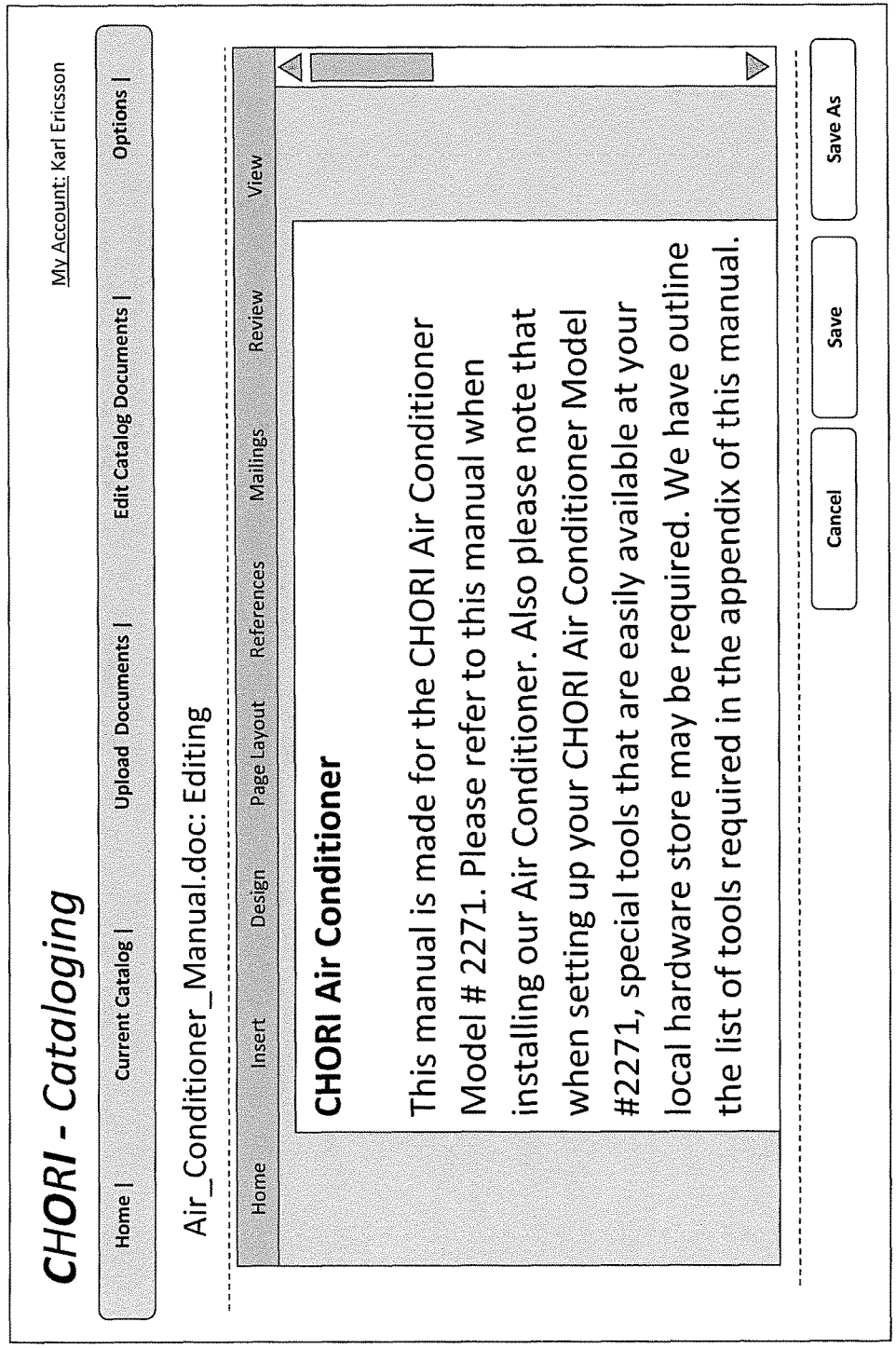

Further, the user may be given the option of editing the document without having to open the document on an application originally used to create the document (e.g., Microsoft Word, Microsoft Excel, Microsoft Power Point, Adobe Acrobat, etc.) that may be located on the user's terminal (step S605). In the case, in which the user selects to edit the document (step S605, yes), he or she may activate the "Edit" button which causes a screen to be presented to the user (step S606), such as shown in FIG. 7E. Such screen may display the document in an editing interface that allows the use to perform editing on the document.

In one example, the document management system or the production print system may connect with a server that stores a copy of the application originally used to create the document and access the application to provide user interfaces of said application to be displayed on the editing interface. In another example, the document management system or the production print system may already have the application originally used to create the document built-in. As result, the document management system or the production print system may simply allow the user access to the application. In yet another example, the document management system or the production print system may be configured with user interfaces which are similar to the application originally used to create the document. Such user interfaces allow the user to edit the document in a similar way.

Figure 7F:
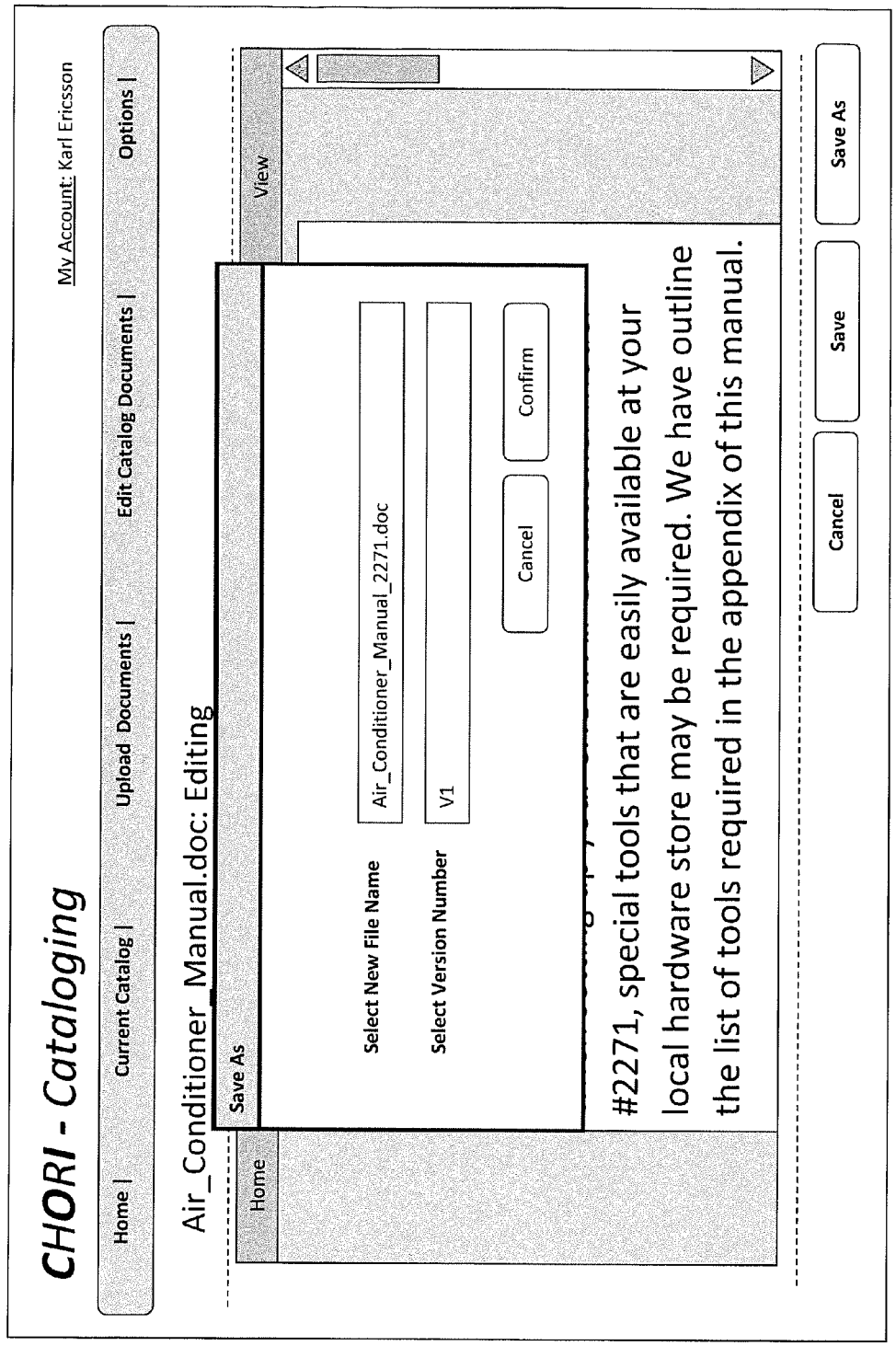
Figure 71:
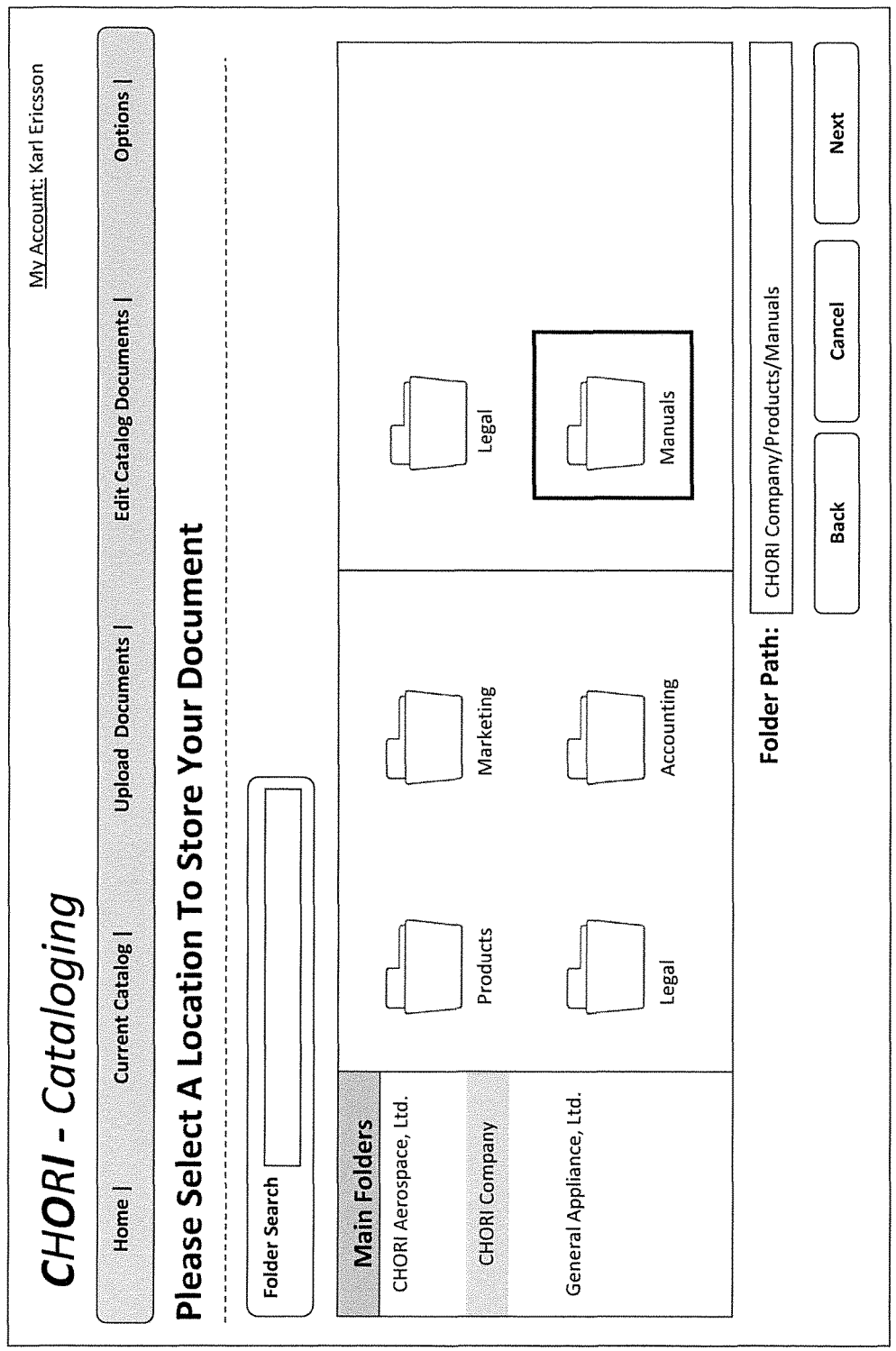

Regardless of how the editing interface is presented to the user, the user can perform edits on the document while accessing the document management system and production print system without having to open the application originally used to create the document (step S607). Further, the user has access to most, if not all, the features of the application. In this case, the user "Karl Ericsson" has forgotten to add a page (e.g., advertisements of other CHORI products) to the end of the air conditioner manual. Therefore, he can add the missing page to the air conditioner manual similar to how he would perform After, the user has performed editing, the user can save the newly edited document as a new version under a different name by activating the "Save As" button which causes a "Save As" screen to be presented to the user, such as shown in FIG. 7F. For example, in this case, the user "Karl Ericsson" has decided to rename the file name of the document from "Air_Conditioner_Manual.doc" to "Air_Conditioner_Manual_2271.doc". Further, he has designated that the version of this new document to be "V1". It should be noted that in the case that the user had previously specified a version number in the metadata or did not specify a version number at all, the version number that the user designated in the "Save As" screen would replace the previous version number or now be set in the metadata. On the other hand, in the case that the user activates the "Save" button, the document will still retain the original file name and version number (if any).

Otherwise, in the case that the user has not performed any edits on the document (step S606, no) or the user has finished perform editing the document, he or she may be continue, by activating the "Next" button which causes a screen to be presented to the user for specifying finishing options (e.g., binding, color, number of sides, sheet size, resolution, stapling, hole-punched, etc.) to be associated with the document, such as shown in FIG. 7G. It should be noted that on the left side of the screen, information concerning the document has been updated to show that the file name is now "Air_Conditioner_Manual_2271.doc" (from "Air_Conditioner_Manual.doc"), the number of pages is "537" (from "536"), the creation date is "Feb. 19, 2015" (from "Jan. 30, 2015") and the last modification date is "Feb. 19, 2015" (from "Feb. 16, 2015"). Such finishing options may be information relating to specific printing options associated with the document. For example, the finishing options may be (1) default options for printing, (2) recommended options for printing or (3) necessary options for printing (e.g., printing using any other finishing option results in a defective output).

In an exemplary embodiment, metadata specified by the user may affect what type of finishing options are displayed to the user. For example, the user "Karl Ericsson" previously specified "Book" for the "Doc. Type" metadata field. As a result, the finishing options include "Binding" field which specifies how the document is to be bound after being printed out.

After the user has selected the finishing options, he or she activates the "Next" button which causes a screen to be presented to the user for specifying access rights to be associated with the document (step S608), such as shown in FIG. 7H. Such access rights indicate groups or individuals who can have access to the document once it is published onto the catalog. For example, in this case, the user "Karl Ericsson" has designated that any user who is part of the groups "CHORI" and "AC Distributors" can have access to the document. Further, the user "Karl Ericsson" has also designated that the independent contractor "Johann Aesir" to have access as well ("Johann Aesir" may be not part of any group). The access rights may also include an option to disable the document. In other words, the document may be published on the catalog but may be inaccessible to users other than the user who published to the document. Further, the user can set the period of time in which the document is to be disabled. For example, the user "Karl Ericsson" has also specified that the document be inaccessible until "Feb. 21, 2015". The access rights may also include an option to allow users to subscribe to the document. Stated another way, users who subscribe to the document may be notified (e.g., email) that the document is updated or a new version of the document is available.

Once the user has selected the access rights, he or she activates the "Next" button which causes a screen to be presented to the user for specifying the location in the catalog to place the document (step S609), such as shown in FIG. 7I. The user may be presented with a list of the highest level folders that he or she has access to in the catalog (e.g., "CHORI Aerospace, Ltd.", "CHORI Company", and "General Appliances, Ltd."). Next, by clicking on a highest level folder and each subsequent folder, the user may select a folder to store the document. For example, "Karl Ericsson" has selected the folder path "CHORI Company/Products/Manuals".

After the user has selected the location to store the document in the catalog, he or she activates the "Next" button which causes a screen to be presented to the user for reviewing the settings previously input by the user (e.g., metadata specifications, finishing options, access rights, folder location), such as shown in FIG. 7J. Once the user has confirmed that the settings are correct, he or she may publish the document onto the catalog by activating the "Publish" button (step S610). Should the action of publishing the document be successful, the user is presented with a screen confirming that the document has been published, such as shown in FIG. 7K. In addition, the user is also presented with an option to upload more documents by activating the "Upload More Files" option.

Figure 8:
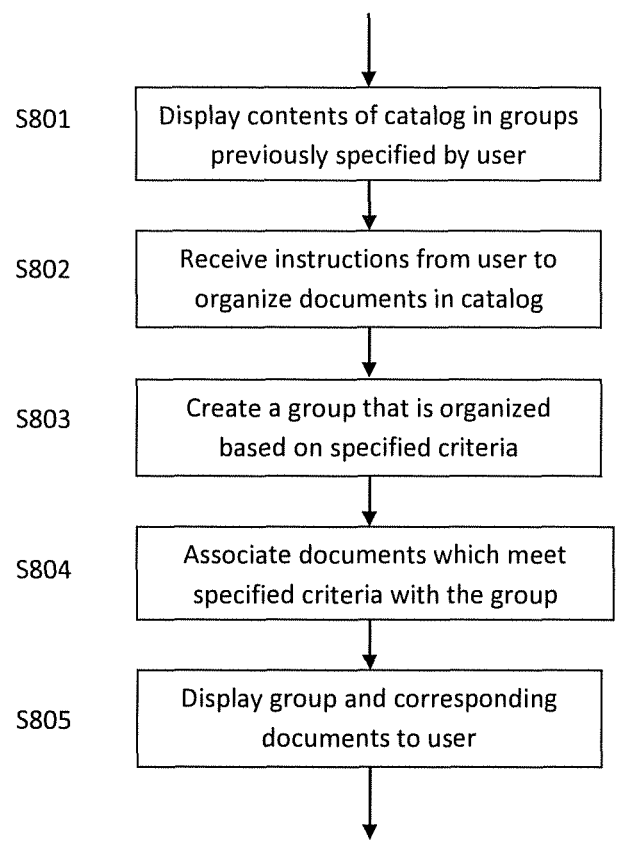
FIG. 8 shows a flow chart of a workflow to organize documents in a catalog in any of the production printing systems shown in FIGS. 1A, 1B and 2A.

FIG. 8 show an event process or workflow performed by a production printing system (e.g., 101*a*), according to an exemplary embodiment.

Figure 9A:
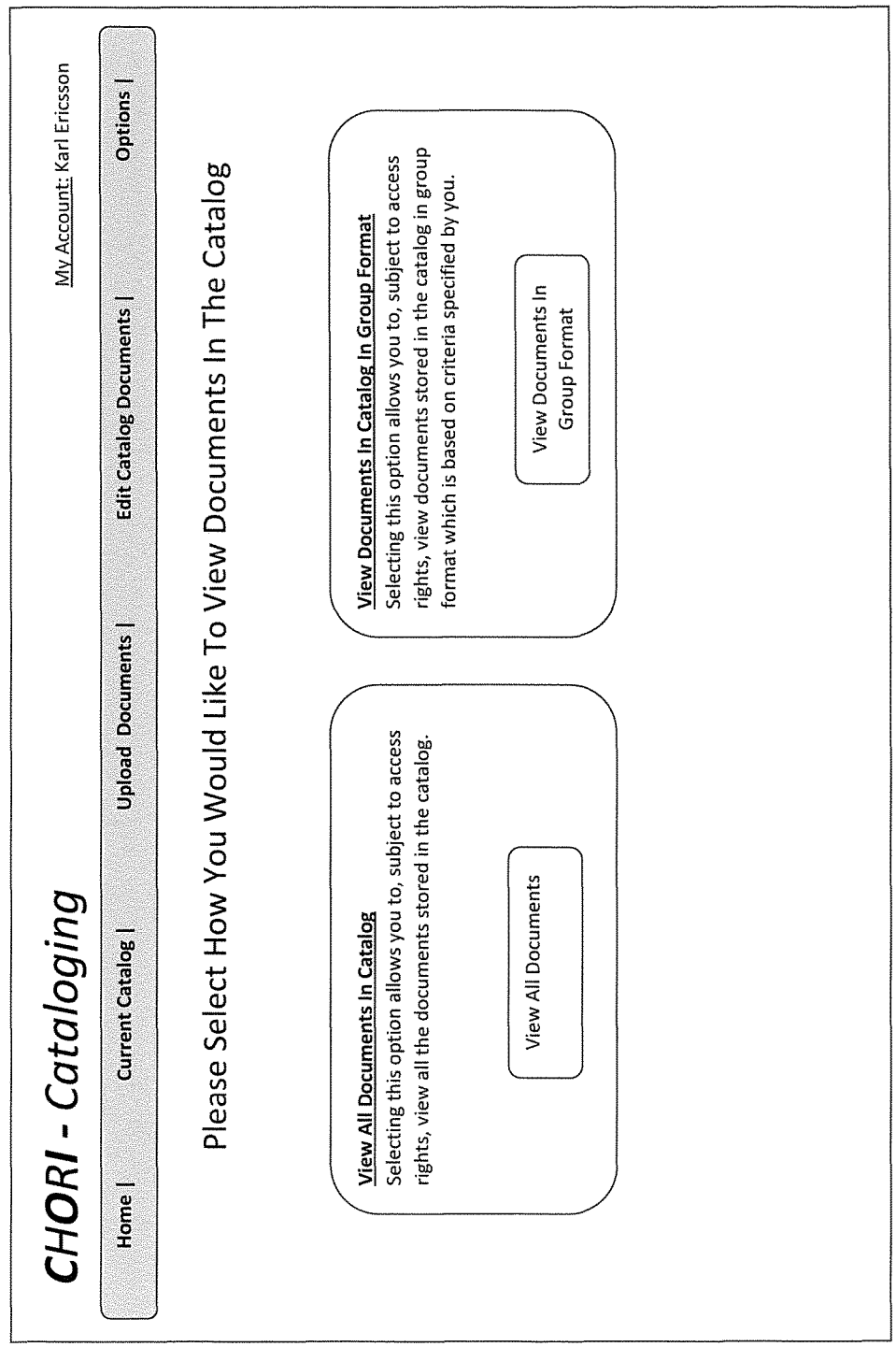

As shown previously in FIG. 7B, there are many actions from which the user can select. In this case, the user has selected to view items that he or she had previously uploaded to the catalog by activating the "View Current Catalog" button. Such action causes a screen to be presented to user for selecting how he or she wants to view the documents on the catalog, such as shown in FIG. 9A. For example, the user may select the option of viewing all of the catalog items (e.g., in list format) or the user can view documents in the catalog based on a group format. In this case, the user selects to view the documents in groups by activating a "View Documents In Group Format" button which causes a screen showing the various groups that the user has created previously to be displayed (step S801), such as shown in FIG. 9B.

The groups are a collection of one or more documents in the catalog that are organized by the user according to a specified criteria. In other words, the user selects a criteria to group documents by and the documents that match the selected criteria are automatically associated and displayed in the group. In an exemplary embodiment, only documents accessible to the user are placed in the group. Such criteria can include, but is not limited to, file type, file name, file size, file creation date, file modification date, metadata, finishing options, access rights, etc.). "Group 1" is an example of grouping documents together based on access rights since, "Group 1" groups documents that are accessible by a user group (e.g., AC Distributors). "Group 2" is an example of grouping documents together based on metadata since, "Group 2" groups documents that have been described as "books" in their metadata. Further, the user can create as many groups as he or she wants and a document located in the catalog can be in more than one group (e.g., "RefrigeratorManual.doc").

Figure 9C:
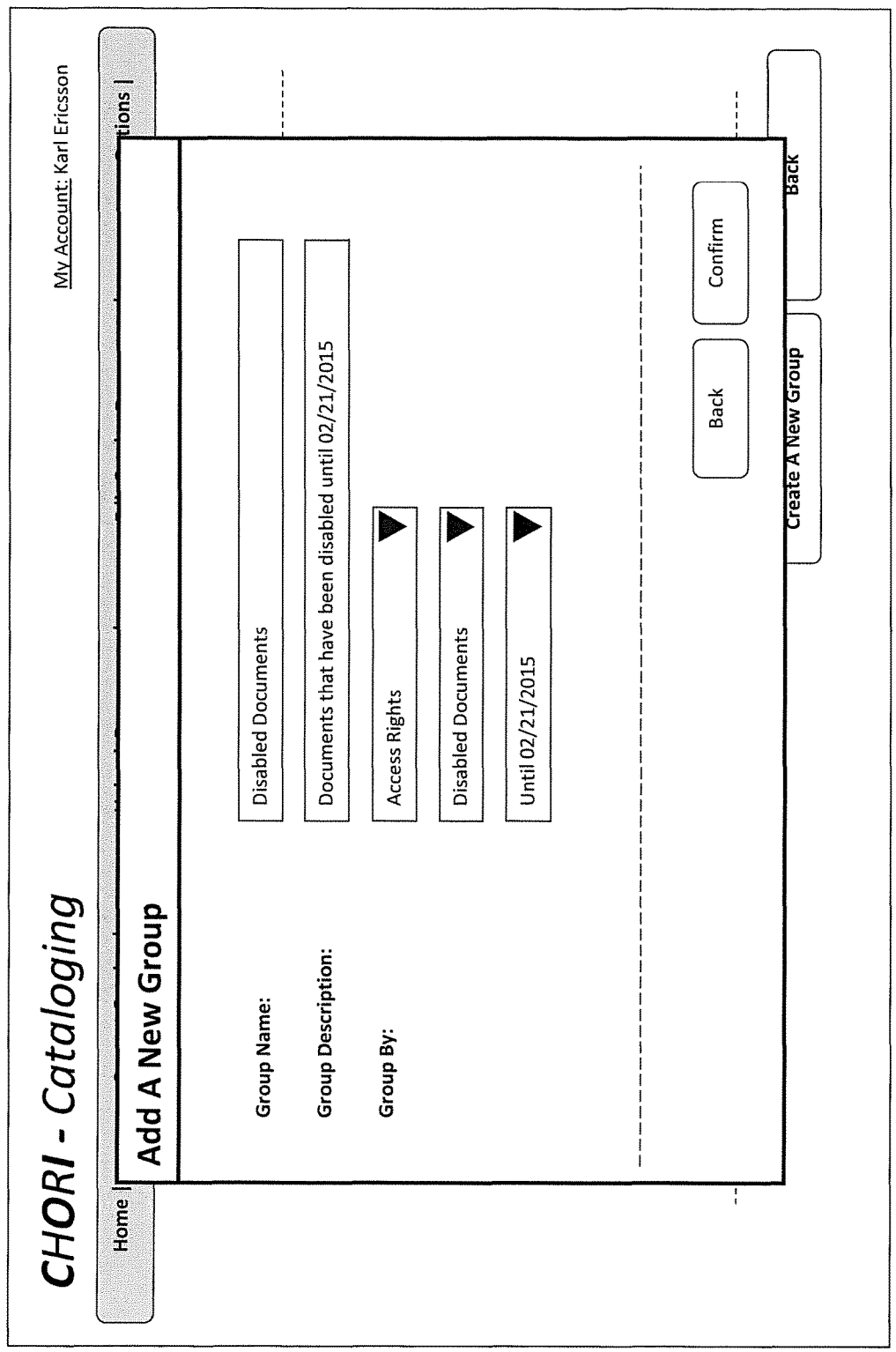

The user can select to add new groups by selecting the a "Create A New Group" button which causes a screen allowing creation of a new group to be presented to the user as (step S802), such as shown in FIG. 9C. Here the user can create a name for the new group (e.g., "Disabled Documents"), write a group description (e.g., "Documents that have been disabled until Feb. 21, 2015") and specify criteria to be used in associating documents with the new group (step S803). In this case, there may be several layers of criteria. For example, the user selects the "Access Rights" criteria which may prompt the user to specify more layers of criteria associated with the "Access Rights" (e.g., user access, group access, disable, etc.). In this case, the user selects the "Disabled Documents" criteria. Since the "Disabled Documents" criteria also includes another layer of criteria which is the date that the disabling of the document should end, the user also specifies this. After the user has specified the criteria for the group, he or she activates the "Confirm" button. This causes the documents that match the criteria specified by the user to be associated with the new group (step S804). Afterwards, the user is presented with all the groups created by the user including the newly created group (step S805), such as shown in FIG. 9D.

Figure 10:
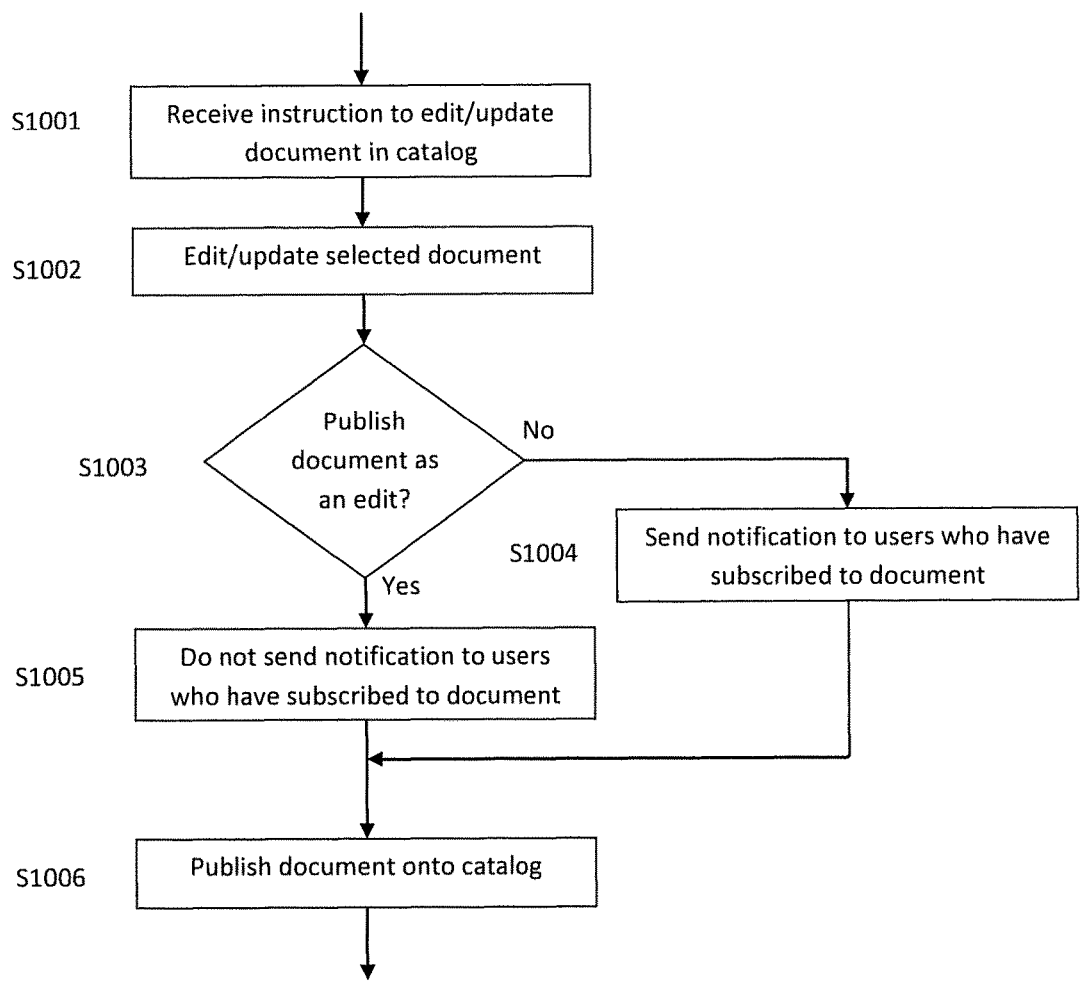
FIG. 10 shows a flow chart of a workflow to edit documents in a catalog in any of the production printing systems shown in FIGS. 1A, 1B and 2A.

FIG. 10 shows an event process performed by, or workflow of, a production printing system (e.g., 101*a*), according to an exemplary embodiment.

Figure 11A:
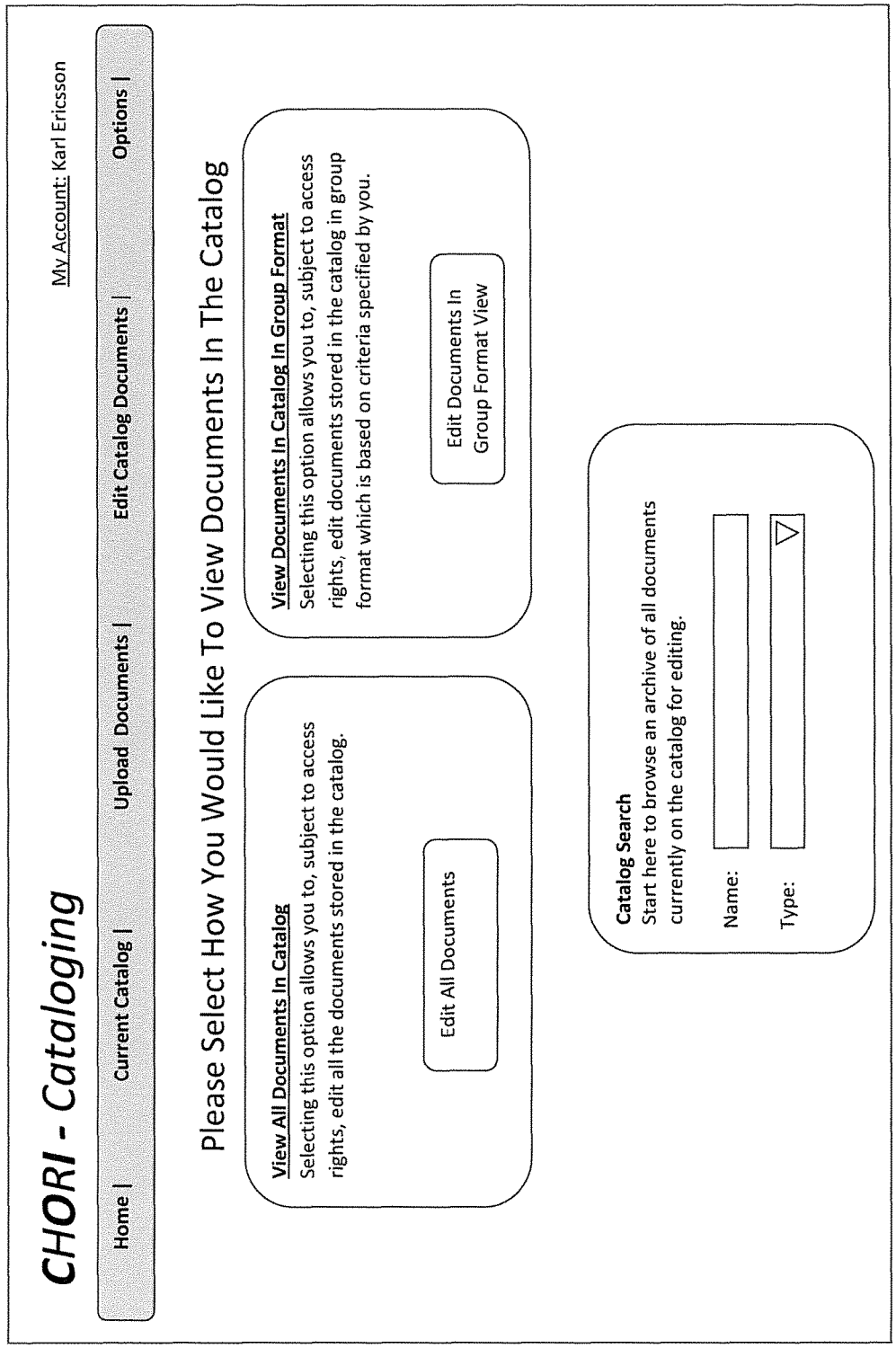

In this case, the user may want to edit or update (1) documents that he or she has uploaded previously to the catalog or (2) documents uploaded by others that the user has access to. As shown previously in FIG. 7B, the user may begin editing by activating the "Edit Catalog Documents" button which causes the user to be presented with a screen for selecting options on for searching for which documents to edit (step S1001), such as shown in FIG. 11A. For example, the user "Karl Ericsson" may view all documents in the catalog (e.g., list form) and may select one of the documents for editing. In another example, the user "Karl Ericsson" may instead view the groups that he previously created and select a document from the groups instead. In yet another example, the user "Karl Ericsson" may search for the document that he wants to edit.

After the user selects the document, he or she may edit the document (step S1003), such as shown in FIG. 11B. Such editing may include changing the document itself (e.g., adding a new page or images, typing new sentences, changing font, etc.) or modifying information associated with the document (e.g., metadata, finishing options, access rights, etc.).

In this example, the user "Karl Ericsson" has decided to edit the document "Air_Conditioner_Manual_2271" that he previously published to the catalog. In this case, he has added more pages to the document (e.g., 537 to 600), changed the finishing options (e.g., from spiral to stitching, color to gray scale, A4 sized paper to 8.5×11 sized paper, deleted any comments) and modified the access rights (e.g., no more disabling, deleted any comments, etc.). The user "Karl Ericsson" may have added more pages to clarify features of the air conditioner manual based on feedback from initial feedback from those who read the air conditioner manual. He may also have changed the finishing options due to a request from CHORI Company's distributor (e.g., "AC Distributors") and modified the access rights since he does not need to disable the document anymore. Further the comments may have been deleted to reflect this change since they no longer apply.

After the user has finished modifying the document, he or she may have the option of deciding whether to publish the document as a minor edit or an update (step S1003). For example, the user may have noticed minor spelling mistakes or that few words in the document have different fonts than others. It would be inconvenient to notify users who had subscribed to receive document updates for such a minor edit. As a result, the user can republish the document without having to informing subscription users by activating the "Publish as Edit" button (step S1003, yes). In this manner notification that the document has been edited is not sent to any users (step S1005). On the other hand, in the case that the user publishes the document as an update by activating the "Publish as Update" button (step S1003, no), any users who subscribed to the document would be informed that an update has occurred (step S1005). The user may want to publish the document as an update when there are substantial changes to the document or when important information is added. Regardless of which option the user selects, the document is republished into the catalog (step S1006).

Figure 12:
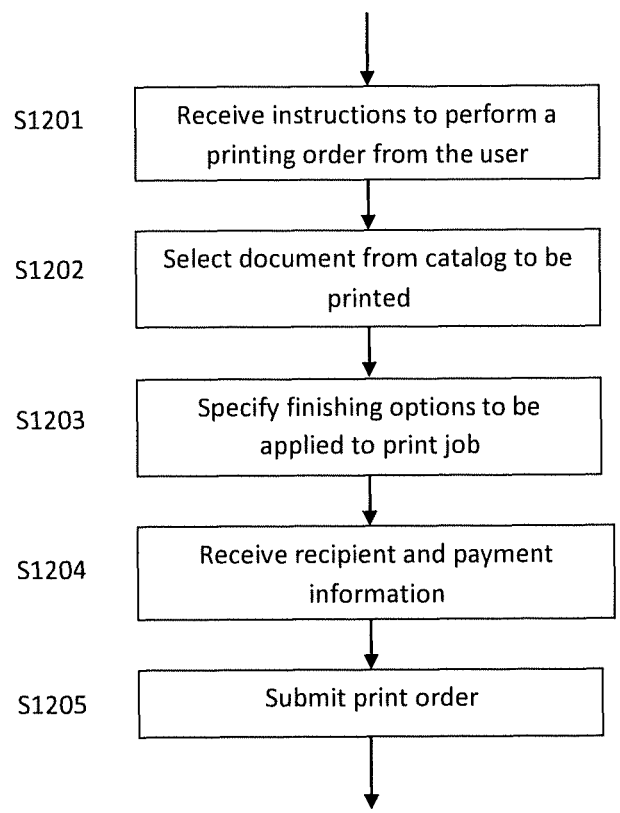
FIG. 12 shows a flow chart of a workflow to order documents from a catalog in any of the production printing systems shown in FIGS. 1A, 1B and 2A.

FIG. 12 show an event process or workflow performed by a production printing system (e.g., 101a), according to an exemplary embodiment.

Figure 13B:
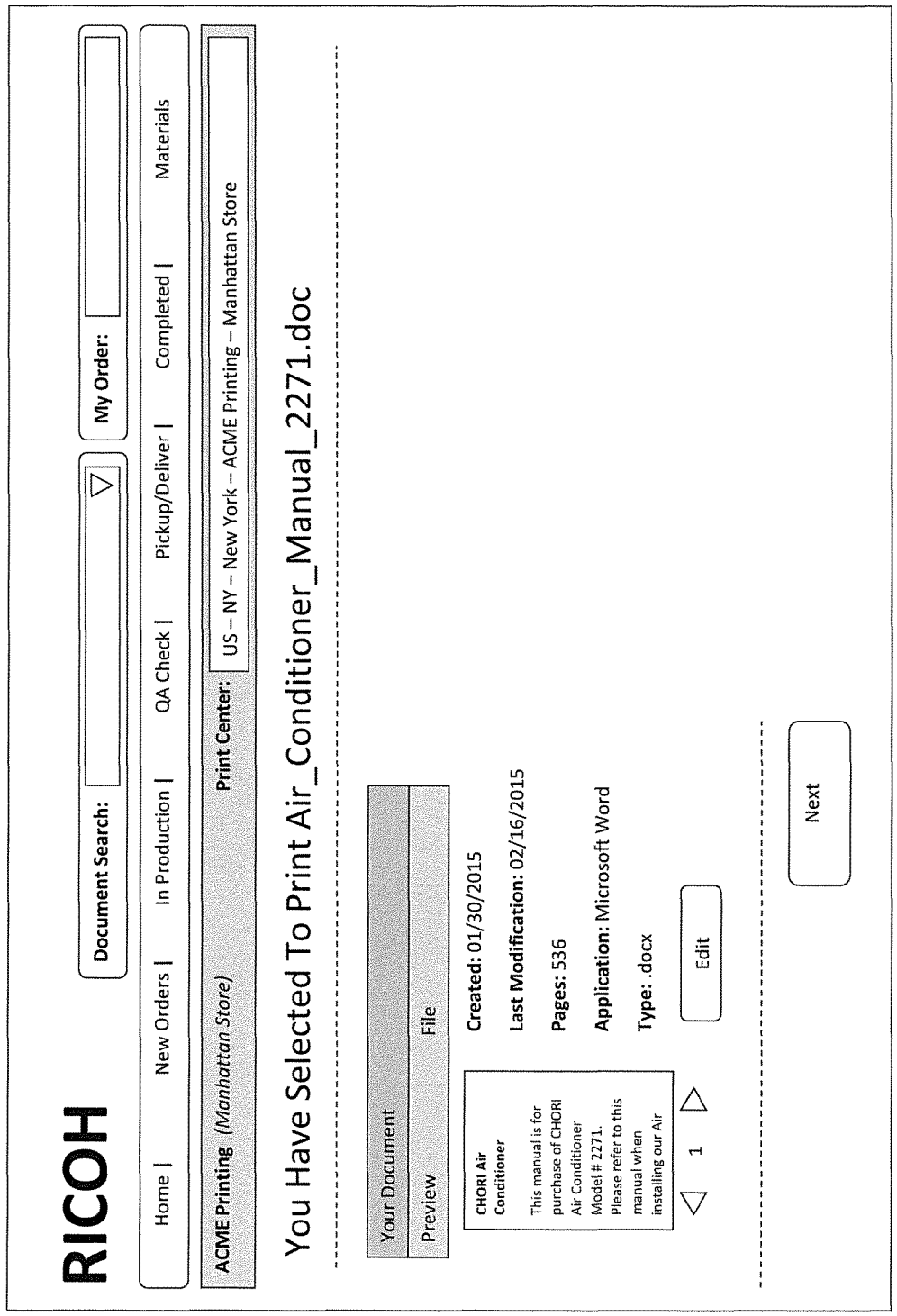
Figure 13C:
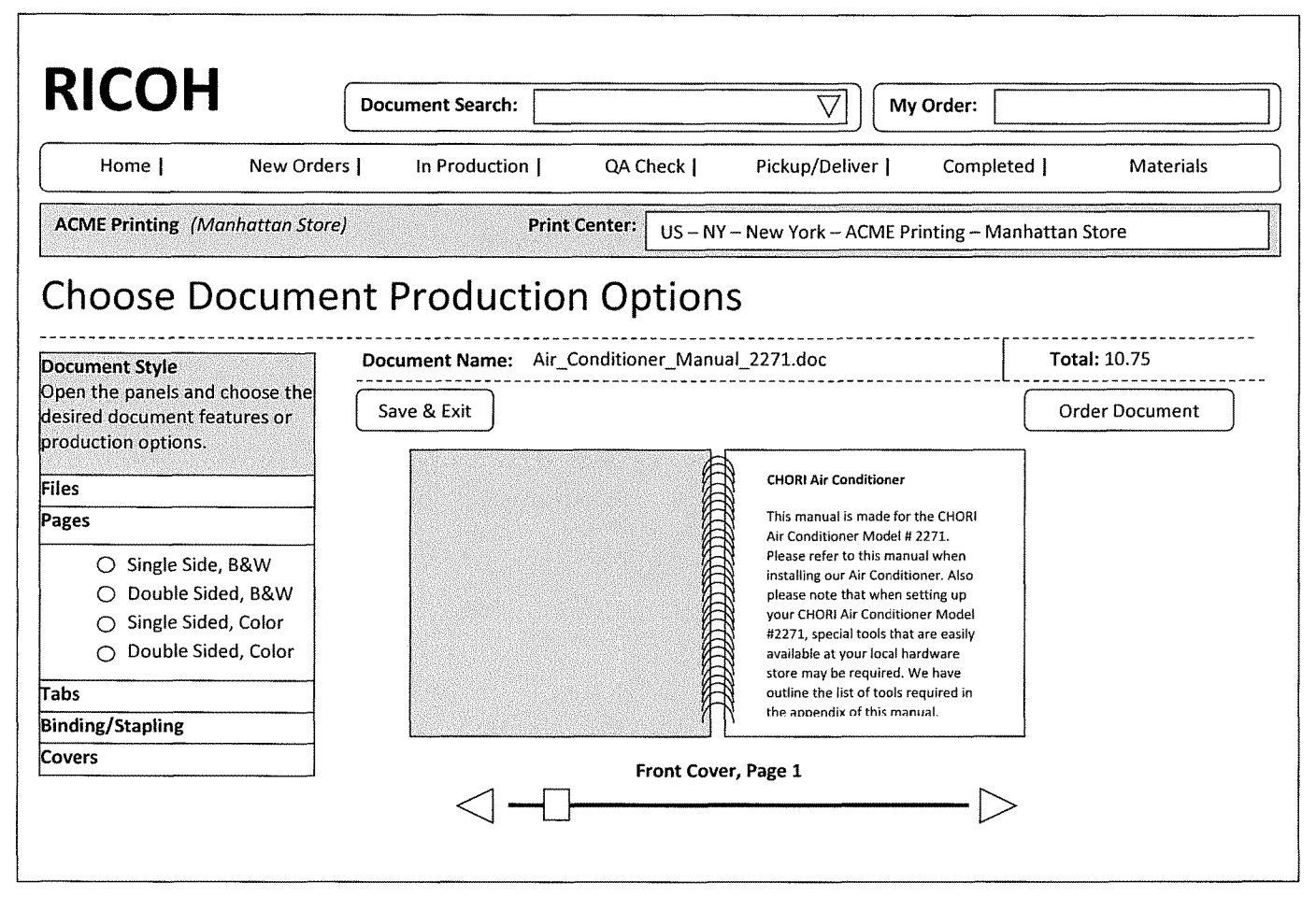

In this case, a user using a terminal (e.g., user terminal 106) may order documents on a catalog from a production printing system (e.g., production printing system 101). Such process commences when a user activates a "New Orders" button (step S1201), such as shown in FIG. 13A. Next, the user selects a document from the catalog to be printed (step S1202), such as shown in FIG. 13B. Afterwards, the user selects finishing options for the document (step S1203), such as shown in FIG. 13C. The user is also presented with the cost of printing the document. When the user is finished with specifying the settings for the document, he or she inputs recipient and payment information (step S1204), such as shown in FIG. 13D. Finally, the user submits the print job by activating a "Place Order" button (step S1205).

The orders in which the steps are performed in the aforementioned methods are not limited to those shown in the examples of FIGS. 6, 8, 10, 12, and may be switched as long as similar results are achieved. Also, it should be noted that the methods or processes illustrated in the examples of FIGS. 6, 8, 10, 12 may be implemented using any of the systems described in connection with FIGS. 1A and 1B.

The aforementioned specific embodiments are illustrative, and many variations can be introduced on these embodiments without departing from the spirit of the disclosure or from the scope of the appended claims. For example, various aspects, features and advantages disclosed herein can applied to automate device driver installation, even when the device for which the driver is needed does not have any print functionality. Further, although the aspects, features and advantages are discussed herein in connection with a print application, it should be understood that such aspects and feature may be integrated in a program that is not application software per se, but may be instead, for example, an operating system, a snap-in, a plug-in, an add-on, an extension, or another program not normally referenced as an application.

In addition, elements and/or features of different examples and illustrative embodiments may be combined with each other and/or substituted for each other within the scope of this disclosure and appended claims.

What is claimed is:

1. A network system including provisions for an authorized user to access, from a third party terminal via a network, a production printing system through any of plural document management systems having respective different document organization schemas, the network system comprising:
a catalog database that registers a catalog of catalog items available for specified production, wherein each catalog item amongst the catalog items registered in the catalog database is available for order by a production printing user, for production;
a generic management interface provided in the production printing system and configured to interface via the network with each of the plural document management systems; and
a document management interface provided in any document management system amongst the plural document management systems, the document management system registering content including at least documents, the document management interface being configured to interface with the generic management interface provided in the production printing system and to provide a user interface to the third party terminal to permit the third party terminal to access, subject to authenticated access rights, the production printing system via the document management interface and the generic management interface, to upload a specified document that is registered in the document management system and to publish the specified document to the catalog.

2. The network system of claim 1, wherein the document management interface provides a Web-based user interface through the network to the third party terminal, for accessing the catalog and the document management system, upon login and authentication.

3. The network system of claim 1, wherein upon publication of an item to the catalog by the third party terminal, the third party terminal is permitted via the user interface provided by the document management interface to modify the published item or item settings.

4. The network system of claim 1, wherein upon publication of an item to the catalog by the third party terminal, the third party terminal is permitted via the user interface provided by the document management interface to replace the published item in the catalog with an updated version of the item.

5. The network system of claim 1, wherein the third party terminal is permitted via the user interface provided by the document management interface to create a new item to be added to the catalog, by retrieving a document from the document management system and at least one of modify the document and specify item settings.

6. The network system of claim 1, wherein the third party terminal is permitted via the user interface provided by the document management interface to specify an organization structure of plural items added to the catalog from the third party terminal.

7. The network system of claim 1, wherein the third party terminal is permitted via the user interface provided by the document management interface to specify that plural items from the document management system are to be added to the catalog in an organization structure different to that of the items in the document management system.

8. The network system of claim 1, wherein the third party terminal is permitted via the user interface provided by the document management interface to specify that plural items added to the catalog from the third party terminal are to be organized in the catalog according to specified criteria.

9. The network system of claim 1, wherein the third party terminal is permitted via the user interface provided by the document management interface to specify that plural items from the document management system are to be added to the catalog with access rights specified according to at least one of user name and group name.

10. The network system of claim 1, wherein for each item to be added, the third party terminal is permitted via the user interface provided by the document management interface to specify meta data in addition to the document to be published in the catalog.

11. The network system of claim 1, wherein upon publication of an item from the third party terminal to the catalog, the third party terminal is permitted via the user interface provided by the document management interface to modify the published item or item settings.

12. The network system of claim 1, wherein the third party terminal is permitted via the user interface provided by the document management interface to check out or disable an item added to the catalog from the third party terminal.

13. The network system of claim 1, wherein the third party terminal is permitted via the user interface provided by the document management interface to modify an item added to the catalog from the third party terminal.

14. The network system of claim 1, wherein the third party terminal is permitted via the user interface provided by the document management interface to modify meta data associated with an item added to the catalog from the third party terminal.

15. The network system of claim 1, wherein the third party terminal is permitted via the user interface provided by the document management interface to modify production options associated with an item added to the catalog from the third party terminal.

16. The network system of claim 1, wherein the third party terminal is permitted via the user interface provided by the document management interface to add a subscription option to an item added to the catalog from the third party terminal.

* * * * *